United States Patent
Lee et al.

(10) Patent No.: US 12,246,512 B2
(45) Date of Patent: Mar. 11, 2025

(54) ALUMINUM COATED BLANK AND MANUFACTURING METHOD THEREOF

(71) Applicant: Hyundai Steel Company, Incheon (KR)

(72) Inventors: Chang Yong Lee, Incheon (KR); Joo Sik Hyun, Incheon (KR); Sang Hyeon Park, Incheon (KR); Jeong Seok Kim, Incheon (KR)

(73) Assignee: Hyundai Steel Company, Incheon (KR)

( * ) Notice: Subject to any disclaimer, the term of this patent is extended or adjusted under 35 U.S.C. 154(b) by 0 days.

(21) Appl. No.: 18/077,459

(22) Filed: Dec. 8, 2022

(65) Prior Publication Data
US 2023/0104841 A1 Apr. 6, 2023

Related U.S. Application Data

(63) Continuation of application No. PCT/KR2022/001407, filed on Jan. 26, 2022.

(30) Foreign Application Priority Data

Jun. 30, 2021 (KR) .................. 10-2021-0085771

(51) Int. Cl.
| | | |
|---|---|---|
| *B32B 15/01* | (2006.01) | |
| *B23K 26/322* | (2014.01) | |
| *C22C 38/00* | (2006.01) | |
| *C22C 38/02* | (2006.01) | |
| *C22C 38/04* | (2006.01) | |
| *B23K 101/18* | (2006.01) | |
| *B23K 101/34* | (2006.01) | |
| *B23K 103/04* | (2006.01) | |
| *B23K 103/10* | (2006.01) | |

(52) U.S. Cl.
CPC .......... *B32B 15/012* (2013.01); *B23K 26/322* (2013.01); *C22C 38/002* (2013.01); *C22C 38/02* (2013.01); *C22C 38/04* (2013.01); *B23K 2101/185* (2018.08); *B23K 2101/34* (2018.08); *B23K 2103/04* (2018.08); *B23K 2103/10* (2018.08)

(58) Field of Classification Search
CPC ................ B32B 15/012; B23K 26/322; B23K 2103/04; C22C 38/02; C22C 38/04; C22C 38/002
USPC ....................................................... 428/639
See application file for complete search history.

(56) References Cited

U.S. PATENT DOCUMENTS

| | | |
|---|---|---|
| 9,884,468 B2 | 2/2018 | Kwon et al. |
| 10,286,439 B2 | 5/2019 | Jin et al. |

(Continued)

FOREIGN PATENT DOCUMENTS

| | | |
|---|---|---|
| JP | 2013-220445 A | 10/2013 |
| JP | 2020-531290 A | 11/2020 |

(Continued)

OTHER PUBLICATIONS

Office Action issued Mar. 19, 2024 in corresponding Japanese Patent Application No. 2022-575478 (English translation provided).

*Primary Examiner* — Katherine A Christy
(74) *Attorney, Agent, or Firm* — Fox Rothschild LLP

(57) ABSTRACT

An aluminum-based blank comprises a first plated steel plate and a second plated steel plate, connected at their boundary by a joint.

6 Claims, 12 Drawing Sheets

(56) References Cited

U.S. PATENT DOCUMENTS

| | | | |
|---|---|---|---|
| 10,807,138 B2 | 10/2020 | Miyazaki et al. | |
| 11,319,610 B2 | 5/2022 | Drillet et al. | |
| 11,945,503 B2 | 4/2024 | Alvarez et al. | |
| 2018/0126437 A1* | 5/2018 | Miyazaki | C22C 38/04 |
| 2020/0180077 A1* | 6/2020 | Riquelme | B23K 26/044 |
| 2021/0078103 A1 | 3/2021 | von der Heydt et al. | |
| 2021/0362762 A1 | 11/2021 | Lawson | |

FOREIGN PATENT DOCUMENTS

| | | |
|---|---|---|
| JP | 2021-504570 A | 2/2021 |
| KR | 2014-0071581 A | 6/2014 |
| KR | 2016-0033541 A | 3/2016 |
| KR | 101637084 B1 | 7/2016 |
| KR | 2017-0140415 A | 12/2017 |
| KR | 2018-0058540 A | 6/2018 |
| KR | 10-2018-0095757 A | 8/2018 |
| KR | 2020-0031695 A | 3/2020 |
| KR | 2020-0116956 A | 10/2020 |
| WO | 2020/136585 A1 | 7/2020 |

* cited by examiner

ALUMINUM COATED BLANK AND MANUFACTURING METHOD THEREOF

CROSS-REFERENCES TO RELATED APPLICATIONS

This application is a continuation application of PCT/KR2022/001407 filed Jan. 26, 2022, which claims priority of Korean Patent Application 10-2021-0085771 filed on Jun. 30, 2021. The entire contents of these applications are incorporated herein by reference in their entirety.

TECHNICAL FIELD

The present invention relates to an aluminum-based plated blank and a method of manufacturing same.

BACKGROUND

Parts having various strengths are used in vehicles. As an example, during a vehicle collision or overturn, portions that need to absorb energy require relatively weak strength, and portions that need to maintain shapes to secure a passenger's survival space require strong strength.

When portions that need to absorb energy during a collision have an excessively high strength, the portions cannot absorb impact energy properly but transfer the impact energy to other parts as it is, and rather, the portions cause a problem of transferring an excessive impact to the passengers and other parts of the vehicle.

Vehicles are continuously required to reduce the weight and cost, and accordingly, it is necessary for one part to have different strengths that are partially different from each other.

Some sections of the part require high strength to protect passengers, but some sections require relatively low strength to absorb impact energy.

For such a part, there is a B-pillar of a passenger car as a representative example. Relatively low tensile strength is required for a lower portion of the B-pillar, and high tensile strength is required for the upper portion of the B-pillar. The reason for the difference in strength is that the portion (the upper portion that needs to support the roof in case of overturning) that needs to maintain its shape with high strength during a vehicle collision and the portion (the lower portion that is highly likely to laterally collide with other vehicles) that needs to absorb the impact while being crushed are required simultaneously.

In addition, to secure a stable space to prevent injuries to passengers, because the upper portion of the B-pillar should be maintained in shape, high strength is required. When the upper strength of the B-pillar is not secured, in the case where the vehicle overturns, the roof will fall down and cause a great threat to the safety of passengers. However, because the lower portion of the B-pillar needs to absorb impact energy while being deformed, relatively low strength is required. When the lower portion of the B-pillar also has high strength, collision energy is not absorbed during a lateral collision, and the impact is transferred to other structural material.

Though specific required strength changes depending on the kind or shape of a vehicle, the upper portion of the B-pillar requires tensile strength of about 1350 MPa or greater while the lower portion of the B-pillar requires tensile strength of about 450 MPa or greater and less than 1350 MPa.

Conventionally, a method of forming a part with a low-strength material and attaching a separate reinforcing material to a portion requiring high strength was used, but, in the case where one part requires different strength by section, a material with high curability (or a thick material) was used for the upper portion, a material with low strength and low curability (or a thin material) was used for the lower portion, the two materials were bonded by a laser to make blank, a hot stamping process was performed, and then a final product was manufactured.

Meanwhile, a tailer-welded blank TWB is a part manufactured by joining two or more steel plate materials different in at least one of a material and a thickness. As a material for such a tailer-welded steel plate, an Al—Si plated layer is used on the surface.

However, when the plated steel plate material is joined with a laser, because the ingredients of the plated layer penetrates into the molten pool of the junction (joint) portion, the junction portion has different properties from the parent material. When the plated layer is aluminum-silicon (Al—Si) or zinc (Zn)-based, the plating ingredient is mixed into the junction portion during laser bonding, and results in deterioration of mechanical properties.

Therefore, the strength degradation of the junction portion may be solved or minimized by a pillar wire ingredient, but the mixed plated layer ingredient (Al) may not be evenly diluted with the parent material depending on the material (material with a large amount of plating) and bonding conditions (high bonding speed). This may cause problems such as segregation and the like, so that the effect of the pillar wire ingredient alone may not be sufficient.

Background art related to the present invention is disclosed in Republic of Korea Patent Registration No. 10-1637084 (published on Jul. 6, 2016, title of invention: pillar wire and method of manufacturing customized welding blank using the same).

SUMMARY

Technical Problem

According to an exemplary embodiment of the present invention, an aluminum-based plated blank capable of minimizing deterioration of hardness and physical properties of a blank joint is provided.

According to an exemplary embodiment of the present invention, an aluminum-based plated blank capable of preventing defect occurrence such as segregation occurrence and the like in a blank joint is provided.

According to an exemplary embodiment of the present invention, an aluminum-based plated blank capable of minimizing deterioration of properties of a blank joint after a hot stamping process is provided.

According to an exemplary embodiment of the present invention, a method of manufacturing an aluminum-based plated blank is provided.

Technical Solution

An exemplary embodiment of the present invention provides an aluminum-based plated blank includes: a first plated steel plate; a second plated steel plate connected to the first plated steel plate; and a joint connecting the first plated steel plate and the second plated steel plate at a boundary between the first plated steel plate and the second plated steel plate. Each of the first plated steel plate and the second plated steel plate includes a base steel and a plated layer formed with an adhesion amount of 20 to 100 g/m² on at least one surface of the base steel and including aluminum (Al), and the joint includes aluminum (Al), and an average content of aluminum (Al) in the joint is 0.5 wt % or greater and 1.5 wt % or less.

In the exemplary embodiment, a standard deviation of an aluminum (Al) content of the joint may be 0 or greater and 0.25 or less.

In the exemplary embodiment, the plated layer may include a surface layer formed on a surface of the base steel and including aluminum (Al) in an amount of 80 wt % or greater; and a diffusion layer formed between the surface layer and the base steel, wherein the diffusion layer may include aluminum-iron (Al—Fe) and aluminum-iron-silicon (Al—Fe—Si) compounds.

In the exemplary embodiment, the base steel may include carbon (C) in an amount of 0.01 wt % or greater and 0.5 wt % or less, silicon (Si) in an amount of 0.01 wt % or greater to 1.0 wt % or less, manganese (Mn) in an amount of 0.3 wt % or greater to 2.0 wt % or less, phosphorus (P) in an amount greater than 0 and 0.1 wt % or less, sulfur (S) in an amount greater than 0 and 0.1 wt % or less, the balance of iron (Fe), and other unavoidable impurities.

Another exemplary embodiment of the present invention provides a method of manufacturing an aluminum-based plated blank that includes: a step of disposing edges of a first plated steel plate and a second plated steel plate to face each other; and a bonding step of providing a pillar wire at a boundary between the first plated steel plate and the second plated steel plate, and forming a joint connecting the first plated steel plate and the second plated steel plate by irradiating a laser beam. The joint portion is formed by melting the first plated steel plate, the second plated steel plate, and the pillar wire together by irradiation of the laser beam, each of the first plated steel plate and the second plated steel plate includes a base steel and a plated layer formed with an adhesion amount of 20 to 100 g/m² on at least one surface of the base steel and including aluminum (Al), the joint includes aluminum (Al), and an average content of aluminum (Al) in the joint is 0.5 wt % or greater and 1.5 wt % or less.

In the exemplary embodiment, the laser beam may be irradiated to reciprocate across the boundary, the laser beam may have a frequency of 100 to 1500 Hz, and a power of 1 to 20 kW, and a joint-forming speed may be 15 to 170 mm/sec.

In the exemplary embodiment, the joint-forming speed may be 15 to 120 mm/sec, the frequency of the laser beam, the radius of the laser beam, and the joint-forming speed may satisfy relationship of Inequality 1 below.

$$\left(\frac{f \times r}{v}\right)^{\alpha} \geq 1 \quad \text{[Inequality 1]}$$

In Inequality 1, $\alpha$ is 0.7, f is the frequency (Hz) of the laser beam, r is the radius (mm) of the laser beam measured on the surface of the plated steel plate, and v is the joint-forming speed (mm/sec).

In the exemplary embodiment, a standard deviation of an aluminum (Al) content of the joint may be 0 or greater and 0.25 or less.

In the exemplary embodiment, the plated layer may include a surface layer formed on a surface of the base steel and including aluminum (Al) in an amount of 80 wt % or greater; and a diffusion layer formed between the surface layer and the base steel. The diffusion layer may include aluminum-iron (Al—Fe) and aluminum-iron-silicon (Al—Fe—Si) compounds.

In the exemplary embodiment, the base steel may include carbon (C) in an amount of 0.01 wt % or greater and 0.5 wt % or less, silicon (Si) in an amount of 0.01 wt % or greater to 1.0 wt % or less, manganese (Mn) in an amount of 0.3 wt % or greater to 2.0 wt % or less, phosphorus (P) in an amount greater than 0 and 0.1 wt % or less, sulfur (S) in an amount greater than 0 and 0.1 wt % or less, the balance of iron (Fe), and other unavoidable impurities.

In the exemplary embodiment, the pillar wire may include one or more austenite stabilizing elements of carbon (C) and manganese (Mn), the balance of iron (Fe), and unavoidable impurities.

In the exemplary embodiment, when the laser beam is irradiated, at least one of the first plated steel plate, the second plated steel plate, and a laser head irradiating the laser beam may move.

Advantageous Effects

The present invention may minimize deterioration of the hardness and physical properties of the blank joint, prevent the occurrence of defects such as segregation of the blank joint, and minimize joint breakage that occurs due to phase change of segregation into Al—Fe compound by hot stamping process.

DETAILED DESCRIPTION

Figure 1A:
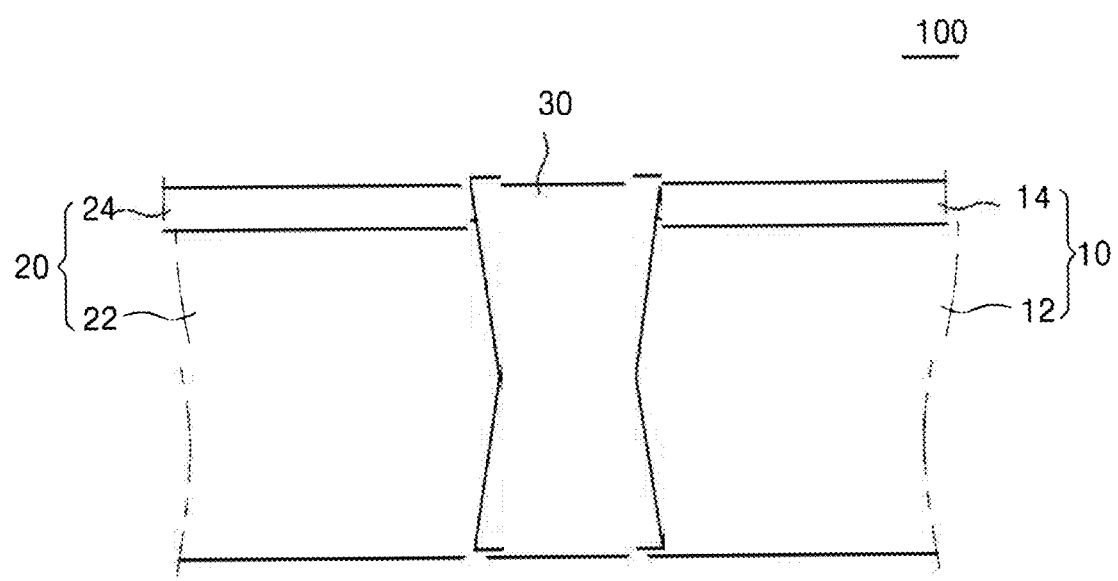
FIGS. 1A and 1B are cross-sectional views schematically showing an aluminum-based plated blank according to an exemplary embodiment, respectively.

As the present invention allows for various changes and numerous embodiments, certain embodiments will be illustrated in the drawings and described in the written description. Effects and features of the present invention, and methods for achieving them will be clarified with reference to embodiments described below in detail with reference to the drawings. However, the present invention is not limited to the following embodiments and may be embodied in various forms.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. That is, for example, intervening layers, regions, or components may be present.

Sizes of elements in the drawings may be exaggerated or reduced for convenience of explanation. As an example, the size and thickness of each element shown in the drawings are arbitrarily represented for convenience of description, and thus, the present disclosure is not necessarily limited thereto.

In the case where a certain embodiment may be implemented differently, a specific process order may be performed in the order different from the described order. As an example, two processes successively described may be simultaneously performed substantially and performed in the opposite order.

Figure 1B:
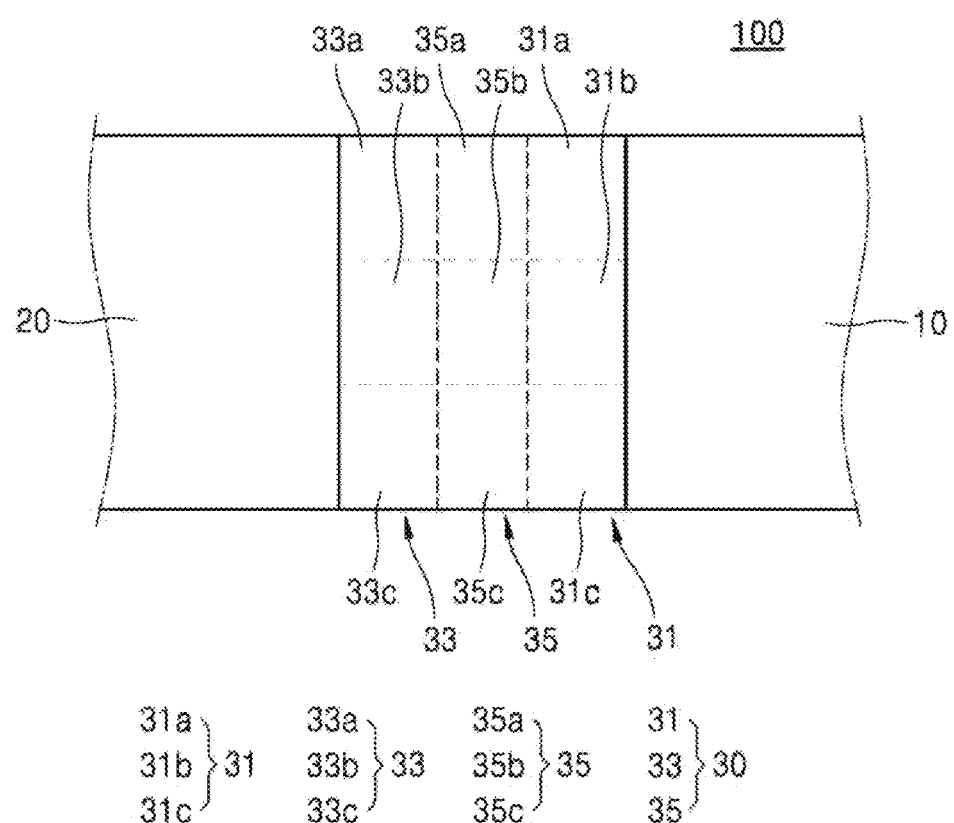
Figure 2A:
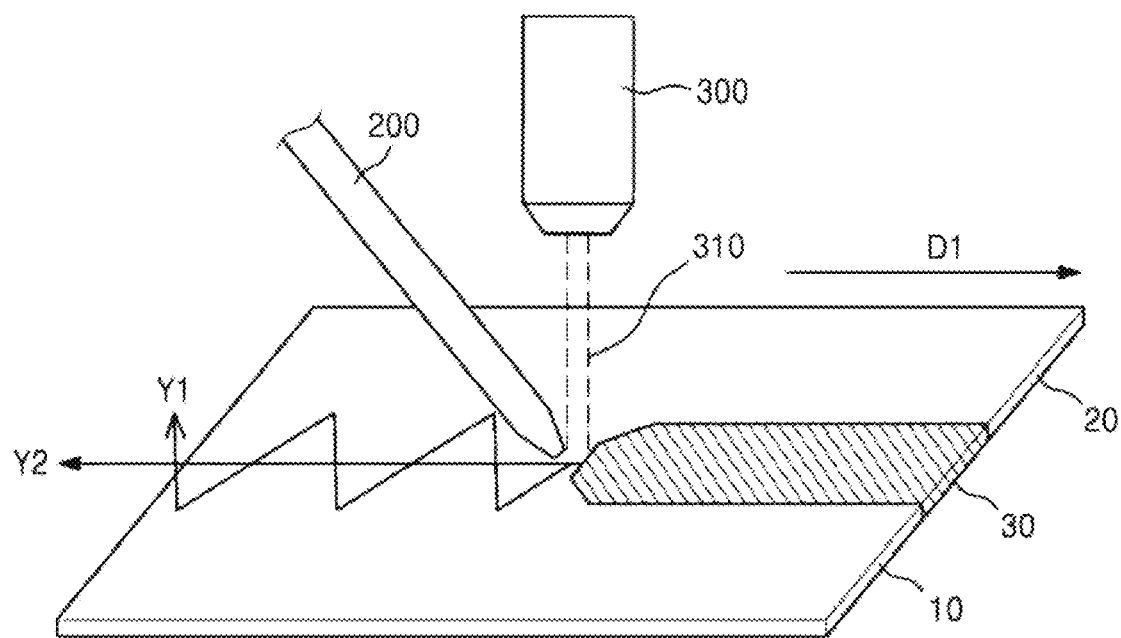
FIGS. 2A and 2B are perspective views schematically showing a process of manufacturing an aluminum-based plated blank according to an exemplary embodiment, respectively.
Figure 2B:
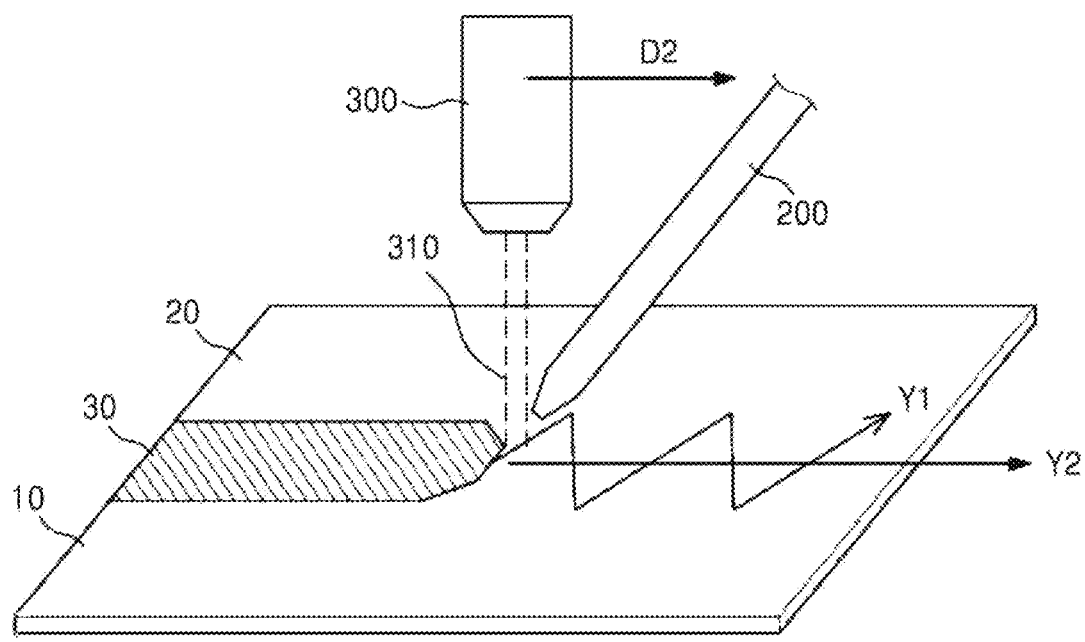
Figure 3:
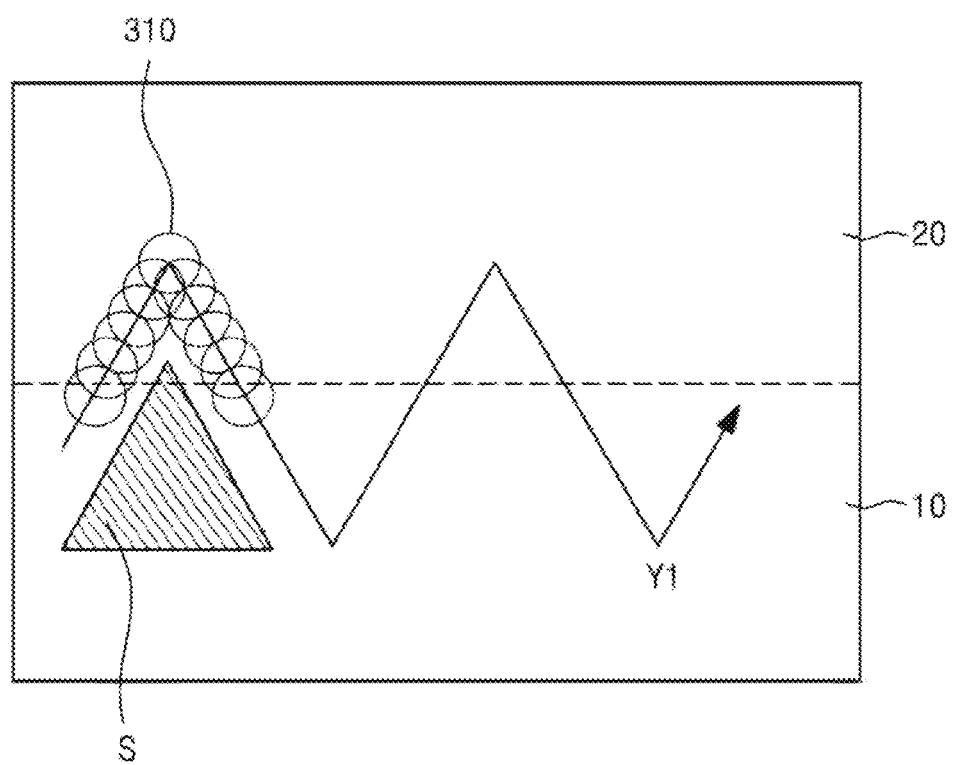
FIG. 3 is a plan view schematically showing a process of bonding an aluminum-based plated plate by irradiating a laser beam.

FIGS. 1A and 1B are cross-sectional views schematically showing an aluminum-based plated blank according to an embodiment, respectively, FIGS. 2A and 2B are perspective views schematically showing a process of manufacturing an aluminum-based plated blank according to an embodiment, respectively, and FIG. 3 is a plan view schematically showing a process of bonding an aluminum-based plated plate by irradiating a laser beam.

First, referring to FIG. 1A, an aluminum-based plated blank 100 according to an exemplary embodiment may include a first plated steel plate 10, a second plated steel plate 20 connected to the first plated steel plate 10, and a joint 30 connecting the first plated steel plate 10 to the second plated steel plate 20 at a boundary between the first plated steel plate 10 and the second plated steel plate 20.

In an exemplary embodiment, the first plated steel plate 10 may include a first base steel 12 and a first plated layer 14 formed on at least one surface of the first base steel 12, and the second plated steel plate 20 may include a second base steel 22 and a second plated layer 24 formed on at least one surface of the second base steel 22. The first base steel 12 and the second base steel 22 may include the same ingredient, and the first plated layer 14 and the second plated layer 24 may include the same ingredient. However, the present invention is not limited thereto. The first base steel 12 and the second base steel 22 may include different ingredients.

Hereinafter, though description is made to the first base steel 12, for convenience of description, the description is equally applicable to the second base steel 22.

In an exemplary embodiment, the first base steel 12 may include a first alloy composition. The first alloy composition may include carbon (C) in an amount of 0.01 wt % or greater and 0.5 wt % or less, silicon (Si) in an amount of 0.01 wt % or greater to 1.0 wt % or less, manganese (Mn) in an amount of 0.3 wt % or greater to 2.0 wt % or less, phosphorus (P) in an amount greater than 0 and 0.1 wt % or less, sulfur (S) in an amount greater than 0 and 0.1 wt % or less, the balance of iron (Fe), and other unavoidable impurities.

In addition, the first alloy composition may further include one or more selected from the group consisting of boron (B), titanium (Ti), niobium (Nb), chromium (Cr), molybdenum (Mo), and nickel (Ni). Specifically, the first alloy composition may further include one or more of boron (B) in an amount of 0.0001 wt % or greater and 0.005 wt % or less, titanium (Ti) in an amount of 0.01 wt % or greater and 0.1 wt % or less, niobium (Nb) in an amount of 0.01 wt % or greater and 0.1 wt % or less, chromium (Cr) in an amount of 0.01 wt % % or greater and 0.5 wt % or less, molybdenum (Mo) in an amount of 0.01 wt % or greater and 0.5 wt % or less, and nickel (Ni) in an amount of 0.01 wt % or greater and 1.0 wt % or less. For example, because the first plated steel plate 10 includes the first base steel 12, it may be understood that the first plated steel plate 10 includes the first alloy composition.

Because the aluminum-based plated blank 100 includes the first plated steel plate 10 and the second plated steel plate 20 including the first alloy composition and including different thicknesses and/or ingredients, the aluminum-based plated blank 100 may be hot-stamped and then some section of the blank may absorb impact energy. As an example, the aluminum-based plated blank 100 may include the first plated steel plate 10 and the second plated steel plate 20 having different ingredients, thus having different strengths after hot stamping, and having the same thickness, or include the first plated steel plate 10 and the second plated steel plate 20 having the same ingredient, thus having the same or similar strength after hot stamping, and having different thicknesses, and the impact energy may be absorbed by a steel plate having a small product of the tensile strength (MPa) and the thickness (mm) of the first plated steel plate 10 and the second plated steel plate 20. However, the present invention is not limited thereto.

Carbon (C) is a major element that determines the strength and hardness of steel, and after the hot stamping (or hot pressing) process, carbon may be added for the purpose of securing the tensile strength of the steel material. In addition, carbon may be added for the purpose of securing hardenability properties of the steel material. In an exemplary embodiment, carbon may be included in an amount of 0.01 wt % or greater and 0.5 wt % or less with respect to the total weight of the first base steel 12. In the case where carbon is included in an amount of less than 0.01 wt % with respect to the total weight of the first base steel 12, it may be difficult to achieve the mechanical strength of the present invention. On the other hand, when carbon is included in an amount of greater than 0.5 wt % with respect to the total weight of the first base steel 12, a problem of lowering the toughness of the steel or a problem of controlling the brittleness of the steel may be caused.

Silicon (Si) may act as a ferrite stabilizing element in the first base steel 12. Silicon (Si) improves ductility by cleaning ferrite, and suppresses low-temperature region carbide formation, thereby improving carbon concentration in austenite. Furthermore, silicon (Si) may be a key element in hot rolling, cold rolling, hot stamping homogenization (perlite, manganese segregation zone control), and fine dispersion of ferrite. In an exemplary embodiment, silicon may be included in an amount of 0.01 wt % or greater and 1.0 wt % or less with respect to the total weight of the first base steel 12. In the case where silicon is included in an amount of less than 0.01 wt % with respect to the total weight of the first base steel 12, the above function may not be sufficiently performed. On the other hand, when silicon is included in an amount of greater than 1.0 wt % with respect to the total weight of the first base steel 12, the hot rolling and cold rolling loads increase, the hot rolling red scale becomes excessive, and the bondability may be deteriorated.

Manganese (Mn) may be added for the purpose of increasing hardenability and strength during heat treatment. In an exemplary embodiment, manganese may be included in an amount of 0.3 wt % or greater and 2.0 wt % or less with respect to the total weight of the first base steel 12. When manganese is included in an amount of less than 0.3 wt % with respect to the total weight of the first base steel 12, there may be a high possibility that the material is not enough (a hard phase fraction is not enough) after hot stamping due to insufficient hardenability. On the other hand, when manganese is included in an amount of greater than 2.0 wt % with respect to the total weight of the first base steel 12, ductility and toughness due to manganese segregation or pearlite bands may be reduced, causing a decrease in bending performance and non-homogeneous microstructure may occur.

Phosphorus (P) is an element that segregates well and may be an element that inhibits the toughness of steel. In an exemplary embodiment, phosphorus may be included in greater than 0 wt % and 0.1 wt % or less with respect to the total weight of the first base steel 12. When phosphorus is included in the above-described range with respect to the total weight of the first base steel 12, deterioration in the toughness of the steel may be prevented. On the other hand, when phosphorus is included in an amount of greater than 0.1 wt % with respect to the total weight of the first base steel 12, it may cause cracks during the process, and the iron phosphide compound may be formed to reduce the toughness of the steel.

Sulfur (S) may be an element that inhibits processability and physical properties. In an exemplary embodiment, sulfur may be included in an amount of greater than 0 wt % and 0.1 wt % or less with respect to the total weight of the first base steel 12. When sulfur is included in an amount of greater than 0.1 wt % with respect to the total weight of the first base steel 12, hot processability may be reduced, and surface defects such as cracks may occur due to the generation of giant inclusions.

Boron (B) is added for the purpose of securing the hardenability and strength of steel by securing the martensite structure, and may have a grain refining effect by increasing the austenite grain growth temperature. In an exemplary embodiment, boron may be included in an amount of 0.0001 wt % or greater and 0.005 wt % or less with respect to the total weight of the first base steel 12. When boron is included in the above-described range with respect to the total weight of the first base steel 12, it is possible to prevent the occurrence of hard phase brittleness at grain boundaries, and secure high toughness and bendability.

Titanium (Ti) may be added for the purpose of strengthening hardenability by forming precipitates and enhancing properties after hot stamping heat treatment. In addition, titanium forms a precipitation phase such as Ti(C,N) at a high temperature, thereby effectively contributing to austenite crystal grain refinement. In an exemplary embodiment, titanium may be included in an amount of 0.01 wt % or greater and 0.1 wt % or less with respect to the total weight of the first base steel 12. When the titanium is included in the above-described range with respect to the total weight of the first base steel 12, continuous casting defects may be prevented and coarsening of the precipitates may be prevented, the physical properties of the steel material may be easily secured, and the occurrence of cracks on the surface of the steel material be prevented or minimized.

Niobium (Nb) may be added for the purpose of increasing strength and toughness according to a decrease in the martensite packet size. In an exemplary embodiment, niobium may be included in an amount of 0.01 wt % or greater and 0.1 wt % or less with respect to the total weight of the first base steel 12. When niobium is included in the above-mentioned range with respect to the total weight of the first base steel 12, the crystal grain refining effect of the steel is excellent in the hot rolling and cold rolling processes, the occurrences of cracks in the slab during steel making/continuous casting and a brittle fracture of the product are prevented, and the formation of steel-making coarse precipitates may be minimized.

Chromium (Cr) may be added for the purpose of improving hardenability and strength of steel. In an exemplary embodiment, chromium may be included in an amount of 0.01 wt % or greater and 0.5 wt % or less with respect to the total weight of the first base steel 12. When chromium is included in the above-mentioned range with respect to the total weight of the first base steel 12, it is possible to improve the hardenability and strength of the steel, and to prevent an increase in production cost and a decrease in the toughness of the steel.

Molybdenum (Mo) may contribute to strength improvement by suppressing coarsening of precipitates and increasing hardenability during hot rolling and hot stamping. Molybdenum may be included in an amount of 0.01 wt % or greater and 0.5 wt % or less with respect to the total weight of the first base steel 12. When molybdenum is included in the above-described range with respect to the total weight of the first base steel 12, the effect of suppressing coarsening of the precipitates and increasing hardenability may be excellent during hot rolling and hot stamping.

Nickel (Ni) may be added for the purpose of securing hardenability and strength. In addition, nickel is an austenite stabilizing element and may contribute to improvement of elongation by controlling austenite transformation. In an exemplary embodiment, nickel may be included in an amount of 0.01 wt % or greater and 1.0 wt % or less with respect to the total weight of the first base steel 12. In the case where nickel is included in an amount of less than 0.01 wt % with respect to the total weight of the first base steel 12, the above effect may be difficult to implement. When nickel is included in an amount of greater than 1.0 wt % with respect to the total weight of the first base steel 12, toughness may be reduced, cold processibility may be reduced, and manufacturing cost of the product may increase.

In an exemplary embodiment, the first base steel 12 and the second base steel 22 may include different ingredients. In an embodiment, the first iron base 12 may include a second alloy composition including less than 0.20 wt % of carbon, and the second base steel 22 may include a third alloy composition including 0.20 wt % or greater of carbon.

In an exemplary embodiment, the first base steel 12 may include the second alloy composition. The second alloy composition may include carbon (C) of 0.01 wt % or greater and less than 0.20 wt %, silicon (Si) of 0.01 wt % or greater and 0.8 wt % or less, manganese (Mn) of 0.8 wt % or greater and 2.0 wt % or less, phosphorus (P) of greater than 0 and 0.05 wt % or less, sulfur (S) of greater than 0 and 0.01 wt % or less, the balance of iron (Fe), and other unavoidable impurities.

In addition, the second alloy composition may further include one or greater of boron (B), titanium (Ti), niobium (Nb), chromium (Cr), and aluminum (Al). Specifically, the second alloy composition may further selectively include one or greater of boron (B) of 0.0001 wt % or greater and 0.003 wt % or less, titanium (Ti) of 0.01 wt % or greater and 0.1 wt % or less, niobium (Nb) of 0.01 wt % or greater and 0.1 wt % or less, chromium (Cr) of 0.01 wt % or greater and 0.5 wt % or less, and aluminum of 0.001 wt % or greater and 0.1 wt % or less. For example, because the first plated steel plate 10 includes the first base steel 12, it may be understood that the first plated steel plate 10 includes the second alloy composition.

In an exemplary embodiment, carbon may be included in an amount of 0.01 wt % or greater and less than 0.20 wt % with respect to the total weight of the first base steel 12. In the case where carbon is included in an amount of less than 0.01 wt % with respect to the total weight of the first base steel 12, it may be difficult to achieve the mechanical strength of the present invention. On the other hand, when carbon is included in an amount of 0.20 wt % or greater with respect to the total weight of the first base steel 12, a problem of lowering the toughness of the steel or a problem of controlling the brittleness of the steel may be caused.

In an exemplary embodiment, silicon may be included in an amount of 0.01 wt % or greater and 0.8 wt % or less with respect to the total weight of the first base steel 12. In the case where the first base steel 12 is included in an amount of less than 0.01 wt % with respect to the total weight of the first base steel 12, the above function may not be sufficiently performed. On the other hand, when silicon is included in an amount greater than 0.8 wt % with respect to the total weight of the first base steel 12, the hot rolling and cold rolling loads increase, the hot rolling red scale becomes excessive, and the bondability may be deteriorated.

In an exemplary embodiment, manganese may be included in 0.8 wt % or greater and 2.0 wt % or less with respect to the total weight of the first base steel 12. When manganese is included in an amount of less than 0.8 wt % with respect to the total weight of the first base steel 12, there may be a high possibility that the material is not enough (a hard phase fraction is not enough) after hot stamping due to insufficient hardenability. On the other hand, when manganese is included in an amount of greater than 2.0 wt % with respect to the total weight of the first base steel 12, ductility and toughness due to manganese segregation or pearlite bands may be reduced, causing a decrease in bending performance and non-homogeneous microstructure may occur.

In an embodiment, phosphorus may be included in greater than 0 wt % and 0.05 wt % or less with respect to the total weight of the first base steel 12. When phosphorus is included in the above-described range with respect to the total weight of the first base steel 12, deterioration in the toughness of the steel may be prevented. On the other hand, when phosphorus is included in an amount of greater than 0.05 wt % with respect to the total weight of the first base steel 12, it may cause cracks during the process, and the iron phosphide compound may be formed to reduce the toughness of the steel.

In an exemplary embodiment, sulfur may be included in an amount of greater than 0 wt % and 0.01 wt % or less with respect to the total weight of the first base steel 12. When sulfur is included in an amount of greater than 0.01 wt % with respect to the total weight of the first base steel 12, hot processability may be reduced, and surface defects such as cracks may occur due to the generation of giant inclusions.

In an exemplary embodiment, the second base steel 22 may include the third alloy composition. The third alloy composition may include carbon (C) of 0.20 wt % or greater and 0.5 wt % or less, silicon (Si) of 0.1 wt % or greater and 0.8 wt % or less, manganese (Mn) of 0.3 wt % or greater and 2.0 wt % or less, phosphorus (P) of greater than 0 and 0.05 wt % or less, sulfur (S) of greater than 0 and 0.01 wt % or less, the balance of iron (Fe), and other unavoidable impurities.

In addition, the third alloy composition may further include one or greater of boron (B), titanium (Ti), niobium (Nb), chromium (Cr), molybdenum (Mo), and nickel (Ni). Specifically, the third alloy composition may further selectively include one or greater of boron (B) of 0.001 wt % or greater and 0.005 wt % or less, titanium (Ti) of 0.01 wt % or greater and 0.1 wt % or less, niobium (Nb) of 0.01 wt % or greater and 0.1 wt % or less, chromium (Cr) of 0.01 wt % % or greater and 0.5 wt % or less, molybdenum (Mo) of 0.01 wt % or greater and 0.5 wt % or less, and nickel (Ni) of 0.01 wt % or greater and 1.0 wt % or less. For example, because the second plated steel plate 20 includes the second base steel 22, it may be understood that the second plated steel plate 20 includes the third alloy composition.

In an exemplary embodiment, carbon may be included in an amount of 0.20 wt % or greater and 0.5 wt % or less with respect to the total weight of the second base steel 22. In the case where carbon is included in an amount of less than 0.20 wt % with respect to the total weight of the second base steel 22, it may be difficult to achieve the mechanical strength of the present invention. On the other hand, when carbon is included in an amount of greater than 0.5 wt % with respect to the total weight of the second base steel 22, a problem of lowering the toughness of the steel or a problem of controlling the brittleness of the steel may be caused.

In an exemplary embodiment, silicon may be included in an amount of 0.1 wt % or greater and 0.8 wt % or less with respect to the total weight of the second base steel 22. In the case where silicon is included in an amount of less than 0.1 wt % with respect to the total weight of the second base steel 22, the above function may not be sufficiently performed. On the other hand, when silicon is included in an amount of greater than 0.8 wt % with respect to the total weight of the second base steel 22, the hot rolling and cold rolling loads increase, the hot rolling red scale becomes excessive, and the bondability may be deteriorated.

In an exemplary embodiment, manganese may be included in 0.3 wt % or greater and 2.0 wt % or less with respect to the total weight of the second base steel 22. When manganese is included in an amount less than 0.3 wt % with respect to the total weight of the second base steel 22, there may be a high possibility that the material is not enough (a hard phase fraction is not enough) after hot stamping due to insufficient hardenability. On the other hand, when manganese is included in an amount of greater than 2.0 wt % with respect to the total weight of the second base steel 22, ductility and toughness due to manganese segregation or pearlite bands may be reduced, causing a decrease in bending performance and non-homogeneous microstructure may occur.

In an exemplary embodiment, phosphorus may be included in an amount of greater than 0 wt % and 0.05 wt % or less with respect to the total weight of the first base steel 12. When phosphorus is included in the above-described range with respect to the total weight of the second base steel 22, deterioration in the toughness of the steel may be prevented. On the other hand, when phosphorus is included in an amount of greater than 0.05 wt % with respect to the total weight of the second base steel 22, it may cause cracks during the process, and the iron phosphide compound may be formed to reduce the toughness of the steel.

In an exemplary embodiment, phosphorus may be included in an amount of greater than 0 wt % and 0.01 wt % or less with respect to the total weight of the second base steel 22. When sulfur is included in an amount of greater than 0.01 wt % with respect to the total weight of the second base steel 22, hot processability may be reduced, and surface defects such as cracks may occur due to the generation of giant inclusions.

In an exemplary embodiment, when hot-stamping the first plated steel plate 10 including the second alloy composition, the first plated steel plate 10 may have tensile strength of about 450 MPa or greater, preferably about 450 MPa or greater and less than about 1350 MPa after the hot stamping. In an embodiment, when hot-stamping the second plated steel plate 20 including the third alloy composition, the second plated steel plate 20 may have tensile strength of about 1350 MPa or greater and less than about 2300 MPa, preferably about 1350 MPa or greater and less than 1680 MPa after the hot stamping. Alternatively, after hot stamping, the second plated steel plate 20 may have a tensile strength of about 1680 MPa or greater, preferably about 1680 MPa or greater and less than about 2300 MPa. That is, after hot stamping, the first plated steel plate 10 may have tensile strength different from tensile strength of the second plated steel plate 20.

In an exemplary embodiment, the thickness of the first plated steel plate 10 may be the same as the thickness of the second plated steel plate 20. However, the present invention is not limited thereto. In an embodiment, the thickness of the first plated steel plate 10 may be different from the thickness of the second plated steel plate 20.

In an exemplary embodiment, the first base steel 12 and the second base steel 22 may include the same ingredient. In an embodiment, the first base steel 12 and the second base steel 22 may include the third alloy composition.

In an exemplary embodiment, when hot-stamping the first plated steel plate 10 including the third alloy composition, the first plated steel plate 10 may have tensile strength of about 1350 MPa or greater and less than about 2300 MPa, preferably about 1350 MPa or greater and less than 1680 MPa after the hot stamping. Alternatively, after hot stamping, the first plated steel plate 10 may have a tensile strength of about 1680 MPa or greater, preferably about 1680 MPa or greater and less than about 2300 MPa.

In an exemplary embodiment, the second plated steel plate 20 may include the same ingredient as an ingredient of the first plated steel plate 10, that is, the second plated steel plate 20 may include the third alloy composition. Accordingly, after hot stamping, the second plated steel plate 20 may have a tensile strength of about 1350 MPa or greater and less than about 2300 MPa, preferably about 1350 MPa or greater and less than about 1680 MPa. Alternatively, after hot stamping, the second plated steel plate 20 may have a tensile strength of about 1680 MPa or greater, preferably about 1680 MPa or greater and less than about 2300 MPa.

In an exemplary embodiment, the thickness of the first plated steel plate 10 may be different from the thickness of the second plated steel plate 20. However, the present invention is not limited thereto.

In an exemplary embodiment, the first plated steel plate 10 may be manufactured by including steps of reheating a steel slab having a first alloy composition, a second alloy composition, or a third alloy composition, finish-rolling the reheated slab, winding the hot-rolled steel plate, cold-rolling the wound steel plate, annealing the cold-rolled plate material, and forming the first plated layer 14 on the surface of the annealed plate material.

In an exemplary embodiment, the second plated steel plate 20 may be manufactured by including steps of reheating a steel slab having a first alloy composition, a second alloy composition, or a third alloy composition, finish-rolling the reheated slab, winding the hot-rolled steel plate, cold-rolling the wound steel plate, annealing the cold-rolled plate material, and forming the second plated layer 24 on the surface of the annealed plate material.

In an exemplary embodiment, the first plated layer 14 and the second plated layer 24 may include the same ingredient. Hereinafter, though description is made to the first plated layer 14, for convenience of description, the description is equally applicable to the second plated layer 24.

In an exemplary embodiment, the first plated layer 14 may be formed by including steps of immersing the first base steel 12 in a plating bath containing at least one of molten aluminum and aluminum alloy of 600 to 800° C., then performing cooling at an average speed of 1 to 50° C./s.

The first plated layer 14 may be formed on at least one surface of the first base steel 12. The first plated layer 14 may include a diffusion layer and a surface layer sequentially stacked on the first base steel 12. The surface layer is a layer containing 80 wt % or greater of aluminum (Al) and may prevent oxidation of the first base steel 12. The diffusion layer is formed by mutual diffusion of iron (Fe) of the first base steel 12 and aluminum (Al) of the first plated layer 14, and the diffusion layer may include aluminum-iron (Al—Fe) and aluminum-iron-silicon (Al—Fe—Si) compounds. The diffusion layer may include an amount of 20 wt % to 60 wt % of iron (Fe), an amount of 30 wt % to 80 wt % of aluminum (Al), and an amount of 0.1 wt % to 40 wt % of silicon (Si).

In an exemplary embodiment, the diffusion layer may have a higher melting point compared to the surface layer. Because a diffusion layer having a higher melting point than the surface layer is provided between the first base steel 12 and the surface layer, liquid metal embrittlement may be prevented or minimized in which the surface layer is melted during the hot pressing process and aluminum (Al) of the surface layer penetrates the tissue of the first base steel 12.

In an exemplary embodiment, the amount of plating adhesion of the first plated layer 14 may be adjusted by immersing the first base steel 12 in the plating bath, spraying one or more of air and gas on the surface of the first base steel 12 to wipe the molten plated layer, and adjusting the spray pressure.

In an exemplary embodiment, the plating adhesion amount may be formed in 20 to 150 g/m$^2$ on at least one surface of the first base steel 12. Preferably, the plating adhesion amount may be formed in 20 to 100 g/m$^2$ on at least one surface of the first base steel 12. When the plating adhesion amount is less than 20 g/m$^2$, corrosion resistance of a portion where the first plated layer 14 contacts the joint 30 after hot stamping may be reduced. On the other hand, when the plating adhesion amount is greater than 100 g/m$^2$, the amount of aluminum (Al) mixed into the joint 30 when the first plated steel sheet 10 is joined to the second plated steel sheet 20 increases, so that the aluminum (Al) segregation may occur.

In an exemplary embodiment, the area fraction of the surface layer (cross-sectional area of the surface layer/cross-sectional area of the first plating layer), which is the ratio of the cross-sectional area of the surface layer to the cross-sectional area of the plated layer, may be 97% or less. Preferably, the area fraction of the surface layer (cross-sectional area of the surface layer/cross-sectional area of the first plating layer), which is the ratio of the cross-sectional area of the surface layer to the cross-sectional area of the plated layer, may be 65% or greater and 97% or less.

In an exemplary embodiment, the surface layer may include an amount of 80 wt % to 100 wt % of aluminum (Al), and the average thickness of the surface layer may be 10 μm to 40 μm. The surface layer is a layer having a high aluminum (Al) content, and when the area fraction of the surface layer exceeds 97 wt % or the average thickness of the surface layer exceeds 40 μm, the amount of aluminum (Al) mixed into the joint 30 increases and aluminum (Al) segregation may occur. In addition, because the thickness of the diffusion layer becomes thinner, aluminum (Al) of the surface layer is melted during hot stamping so that the molten aluminum (Al) penetrates into the tissue of the first base steel 12 or the tissue of the first base steel 12, or penetrates into the interface portion between the joint portion 30 and the first base steel 12 through the tissue of the first base steel 12. In addition, when the area fraction of the surface layer is less than 65% or the average thickness of the surface layer is less than 10 μm, because the thickness of the diffusion layer becomes thick, the productivity of the hot stamping part may be reduced.

The joint 30 may be formed by aligning the lateral surface of the first plated steel plate 10 and the lateral surface of the second plated steel plate 20 to face each other, then supplying a pillar wire 200 to a boundary between the first plated steel plate 10 and the second plated steel plate 20, and irradiating a laser to melt the first plated steel plate 10, the second plated steel plate 20, and the pillar wire 200. Accordingly, the joint 30 may include an amount of 0.5 wt % or greater and 1.5 wt % or less of aluminum (Al), the remainder of the first plated steel plate 10, the second plated steel plate 20, and the pillar wire 200.

In an exemplary embodiment, the joint 30 may include carbon (C) in an amount of 0.05 wt % or greater and less than 3.0 wt %, silicon (Si) in an amount of 0.05 wt % or greater and less than 1.0 wt %, manganese (Mn) in an amount of 1.0 wt % or greater and less than 3.0 wt %, phosphorus (P) of greater than 0 and less than 0.2 wt %, sulfur (S) in an amount of greater than 0 and less than 0.2 wt %, titanium (Ti) in an amount of 0.01 wt % or greater and less than 0.5 wt %, boron (B) in an amount of 0.0005 wt % or greater and less than 0.01 wt %, aluminum (Al) in an amount of 0.5 wt % or greater and 1.5 wt % or less, the remainder of iron (Fe) and other unavoidable impurities. In addition, the joint 30 may further include one or greater of niobium (Nb) in an amount of 0.01 wt % or greater and less than 1.5 wt % and chromium (Cr) in an amount of 0.05 wt % or greater and less than 2.0 wt %.

In an exemplary embodiment, when the carbon content of the first plated steel plate 10 and the second plated steel plate 20 is 0.2 wt % or greater, the joint 30 may include an ingredient-based material in which ferrite is not formed above a higher Ac3 temperature of an Ac3 temperature of the first plated steel plate 10 and an Ac3 temperature of the second plated steel plate 20. Preferably, the joint 30 may include an ingredient-based material in which ferrite is not formed at 840° C. or higher. Specifically, the joint 30 after the hot stamping process, that is, the joint 30 passing through the hot stamping process of heating the aluminum-based plated blank 100 to 850 to 1000° C., press-molding the plated blank, and rapidly cooling the plated blank at an average cooling rate of 10 to 500° C./s includes an ingredient-based material that may have a microstructure containing 90% or greater of martensite as an area fraction. For example, at the hot stamping heating temperature, the joint 30 may be in a full austenite structure, and then may be transformed into a martensitic structure in an area fraction of 90% or greater, preferably a full martensitic structure upon cooling.

The joint 30 may include an amount of 0.5 wt % or greater and 1.5 wt % or less of aluminum (Al). The content of aluminum included in the joint 30 may be a sum of aluminum mixed from the first plated steel sheet 10, the second plated steel sheet 20, and the filler wire 200 that are melted. When the aluminum content of the joint 30 is less than 0.5 wt %, because the first plated layer 14 and/or the second plated layer 24 should be removed to adjust a mixed amount of aluminum while the first plated steel plate 10 is bonded to the second plated steel plate 20, the efficiency of the manufacturing process may be reduced. On the other hand, when the aluminum content of the joint 30 is greater than 1.5 wt %, the joint 30 may be softened, the martensite fraction of the joint 30 may be lowered after hot stamping, and the mechanical properties of the aluminum-based plating blank 100 may be deteriorated.

The joint 30 may include an amount of 0.05 wt % or greater and less than 3.0 wt % of carbon (C). The content of carbon included in the joint 30 may be a sum of carbon mixed from the first plated steel plate 10, the second plated steel plate 20, and the pillar wire 200 that are melted. When the carbon content of the joint 30 is less than 0.05 wt %, because the joint 30 is softened and the hardness of the joint 30 is less than those of the first plated steel plate 10 and the second plated steel plate 20, breakage may occur in the joint 30. On the other hand, when the carbon content is 3.0 wt % or greater, the hardness of the joint 30 is excessively increased and brittle fracture may occur in the joint 30 due to an external impact or the like.

The joint 30 may include an amount of 0.05 wt % or greater and 1.0 wt % or less of silicon (Si). When the content of silicon included in the joint 30 is less than 0.05 wt %, brittle fracture may occur in the joint 30. On the other hand, when the content of silicon included in the joint 30 is 1.0 wt % or greater, slag may be generated on the surface of the bead.

The joint 30 may include an amount of 1.0 wt % or greater and less than 3.0 wt % of manganese (Mn). The content of manganese included in the joint 30 may be a sum of manganese mixed from the first plated steel plate 10, the second plated steel plate 20, and the pillar wire 200 that are melted. When the manganese content of the joint 30 is less than 1.0 wt %, because the joint 30 is softened during the hot stamping and the hardness of the joint 30 is less than those of the first plated steel plate 10 and the second plated steel plate 20, breakage may occur in the joint 30. On the other hand, when the content of manganese is 3.0 wt % or greater, the hardness of the joint 30 is excessively increased and brittle fracture may occur in the joint 30 due to an external impact and the like, and the quality of the shape of the joint 30 may be deteriorated and cracks may occur in the joint 30 due to the drop in the viscosity of the joint 30 while the joint 30 is melted, and the expansion of the coefficient of expansion during transformation into a solid phase.

The joint 30 may contain an amount greater than 0 and less than 0.2 wt % of phosphorus (P). When the phosphorus content of the joint 30 is 0.2 wt % or greater, brittle fracture due to segregation may occur in the joint 30.

The joint 30 may contain an amount greater than 0 and less than 0.2 wt % of sulfur (S). When the content of sulfur (S) in the joint 30 is 0.2 wt % or greater, cracks may occur in the joint 30 due to the formation of inclusions.

The joint 30 may include an amount of 0.01 wt % or greater and less than 0.5 wt % of titanium (Ti). When the titanium content of the joint 30 is less than 0.01 wt %, because the joint 30 is softened during hot stamping and the hardness of the joint 30 is less than those of the first plated steel plate 10 and the second plated steel plate 20, the joint 30 may be broken. On the other hand, when the titanium content of the joint 30 is 0.5 wt % or greater, brittle fracture may occur in the joint 30.

The joint 30 may include an amount of 0.0005 wt % or greater and less than 0.01 wt % of boron (B). When the boron content of the joint 30 is less than 0.0005 wt %, because the joint 30 is softened during hot stamping and the hardness of the joint 30 is less than those of the first plated steel plate 10 and the second plated steel plate 20, the joint 30 may be broken. On the other hand, when the boron content of the joint 30 is 0.01 wt % or greater, brittle fracture may occur in the joint 30.

Referring to FIG. 1B, in an exemplary embodiment, the joint 30 may include a first lateral portion 31, a second lateral portion 33, and a central portion 35. The first lateral portion 31 may be a portion of the joint 30 adjacent to the first plated steel plate 10, the second lateral portion 33 may be a portion of the joint 30 adjacent to the second plated steel plate 20, and the central portion may be a portion located between the first lateral portion 31 and the second lateral portion 33. That is, the central portion 35 of the joint 30 may be a central (middle) part of the joint 30.

In an exemplary embodiment, the first lateral portion 31, the second lateral portion 33, and the central portion 35 of the joint 30 may be provided in the same width. As an example, the width of the first lateral portion 31 may be ⅓ of the overall width of the joint 30, the width of the second lateral portion 33 may be ⅓ of the overall width of the joint 30, and the width of the central portion 35 may be ⅓ of the overall width of the joint 30. However, the present invention is not limited thereto. In this case, the overall width of the joint 30 may mean a width between a boundary between the joint 30 and the first plated steel plate 10 and a boundary between the joint 30 and the second plated steel plate 20.

In an exemplary embodiment, the first lateral portion 31 may include a first portion 31a, a second portion 31b, and a third portion 31c. The first portion 31a, the second portion 31b, and the third portion 31c of the first lateral portion 31 may be sequentially arranged in a direction crossing the width direction of the joint 30.

In an exemplary embodiment, the second lateral portion 33 may include a fourth portion 33a, a fifth portion 33b, and a sixth portion 33c. The fourth portion 33a, the fifth portion 33b, and the sixth portion 33c of the second lateral portion 33 may be sequentially arranged in a direction crossing the width direction of the joint 30.

In an exemplary embodiment, the central portion 35 may include a seventh portion 35a, an eighth portion 35b, and a ninth portion 35c. The seventh portion 35a, the eighth portion 35b, and the ninth portion 35c of the central portion 35 may be sequentially arranged in a direction crossing the width direction of the joint 30.

In an exemplary embodiment, the average aluminum (Al) content of the joint 30 including the first lateral portion 31, the second lateral portion 33, and the central portion 35 may be 0.5 wt % or greater and 1.5 wt % or less. Specifically, the average aluminum (Al) content measured in the first portion 31a to the ninth portion 35c of the joint 30 may be 0.5 wt % or greater and 1.5 wt % or less.

In an exemplary embodiment, a standard deviation of the aluminum (Al) content of the joint 30 including the first lateral portion 31, the second lateral portion 33, and the central portion 35 may be 0 or greater and 0.25 or less. Specifically, the standard deviation of aluminum (Al) content measured in the first portion 31a to the ninth portion 35c of the joint 30 may be 0 or greater and 0.25 or less.

In an exemplary embodiment, a standard deviation of an aluminum (Al) content of the first lateral portion 31 may be 0 or greater and 0.2 or less. Specifically, the standard deviation of aluminum (Al) content measured in the first portion 31a, the second portion 31b, and the third portion 31c of the first lateral portion 31 may be 0 or greater and 0.2 or less. When the standard deviation of the aluminum (Al) content of the first lateral portion 31 is greater than 0.2, it may mean that aluminum (Al) is unevenly distributed in the first lateral portion 31. That is, when the standard deviation of the aluminum (Al) content of the first lateral portion 31 is greater than 0.2, because the aluminum (Al) is unevenly distributed in the first lateral portion 31, localized aluminum (Al) segregation may occur in the first lateral portion 31 of the joint 30 after hot stamping. Therefore, when the standard deviation of the aluminum (Al) content of the first lateral portion 31 is 0 or greater and 0.2 or less, because the aluminum (Al) is evenly distributed in the first lateral portion 31, localized aluminum (Al) segregation may be prevented from occurring in the first lateral portion 31 of the joint 30, and the microstructure of the first lateral portion 31 may be made uniform after hot stamping, and at the same time, fracture may be prevented from occurring in the joint 30.

In an exemplary embodiment, a standard deviation of an aluminum (Al) content of the second lateral portion 33 may be 0 or greater and 0.2 or less. Specifically, the standard deviation of aluminum (Al) content measured in the fourth portion 33a, the fifth portion 33b, and the sixth portion 33c of the second lateral portion 33 may be 0 or greater and 0.2 or less. When the standard deviation of the aluminum (Al) content of the second lateral portion 33 is greater than 0.2, it may mean that aluminum (Al) is unevenly distributed in the first lateral portion 31. That is, when the standard deviation of the aluminum (Al) content of the second lateral portion 33 is greater than 0.2, because the aluminum (Al) is unevenly distributed in the second lateral portion 33, localized aluminum (Al) segregation may occur in the second lateral portion 33 of the joint 30 after hot stamping. Therefore, when the standard deviation of the aluminum (Al) content of the second lateral portion 33 is 0 or greater and 0.2 or less, because the aluminum (Al) is evenly distributed in the second lateral portion 33, localized aluminum (Al) segregation may be prevented from occurring in the second lateral portion 33 of the joint 30, and the microstructure of the second lateral portion 33 may be made uniform after hot stamping, and at the same time, fracture may be prevented from occurring in the joint 30.

When aluminum (Al) segregation occurs in a portion adjacent to the first plated steel plate 10 and the joint 30 (e.g., the first lateral portion 31) and a portion adjacent to the second plated steel plate 20 and the joint 30 (e.g., the second lateral portion 33), fracture is highly likely to occur between the first plated steel plate 10 and the joint 30 and between the second plated steel plate 20 and the joint 30.

In an exemplary embodiment, because a standard deviation of aluminum (Al) content of a portion adjacent to the first plated steel plate 10 and the joint 30 (e.g., the first lateral portion 31) and a portion adjacent to the second plated steel plate 20 and the joint 30 (e.g., the second lateral portion 33), is 0 or greater and 0.2 or less, the aluminum (Al) is evenly distributed in the first lateral portion 31 and the second lateral portion 33, and the occurrence of breakage between the plated steel plate 10 and the joint 30 and between the second plated steel plate 20 and the joint 30 may be prevented or minimized.

In an exemplary embodiment, the standard deviation of the aluminum (Al) content of a lateral portion adjacent to a steel plate having a large product of tensile strength (MPa) and thickness (mm) after hot stamping among the first lateral portion 31 and the second lateral portion 33 may be equal to or less than the standard deviation of the aluminum (Al) content of a lateral portion adjacent to a steel plate having a small product of the tensile strength (MPa) and the thickness (mm) after stamping. After hot stamping, breakage may be prevented from occurring in the joint 30 by greater evenly distributing aluminum (Al) on a lateral portion adjacent to the steel plate having a large product of a relatively low tensile strength (MPa) and thickness (mm) and having relatively low impact energy absorption performance after hot stamping.

In an exemplary embodiment, the average hardness of the first plated steel plate 10 and the average hardness of the second plated steel plate 20 may be different from each other. In addition, the average hardness of the joint 30 may be greater than at least one of the average hardness of the first base steel 12 and the average hardness of the second base steel 22.

Specifically, in the case of press-molding the aluminum-based plating blank 100 by heating the same to Ac3 or higher, and performing hot-stamping molding by performing cooling the plated blank to 300° C. or less at a cooling rate of 10 to 500° C./s, the average hardness of the joint 30 may be greater than at least one of the average hardness of the first base steel 12 and the average hardness of the second base steel 22. When the aluminum-based plated blank 100 includes a combination of steel plates having the homogenous ingredients (e.g., the case where the first plated steel plate 10 and the second plated steel plate 20 include the first alloy composition, or the first plated steel plate 10 and the second plated steel plate 20 include the third alloy composition, and thus, the ingredients of the first plated steel plate 10 and the second plated steel plate 20 are the same), the average hardness of the joint 30 after hot stamping may be greater than the average hardness of the first base steel 12 and the average hardness of the second base steel 22 after hot stamping. In addition, when the aluminum-based plated blank 100 includes combination of heterogeneous steel plates (e.g., the case where the first plated steel plate 10 and the second plated steel plate 20 include the second alloy composition and the third alloy composition, respectively, or the first plated steel plate 10 and the second plated steel plate 20 include the first alloy composition, and thus, the ingredients of the first plated steel plate 10 and the second plated steel plate 20 are different), the average hardness of the joint 30 after hot stamping may be greater than a minimum hardness of a steel plate having a smaller tensile strength among the first base steel 12 and the second base steel 22 after hot stamping.

In an exemplary embodiment, the minimum hardness of the joint 30 after hot stamping may be greater than the minimum hardness of the first base steel 12 and the second base steel 22 after hot stamping. Specifically, when the aluminum-based plated blank 100 includes a combination of steel plates having the homogenous ingredients (e.g., the case where the first plated steel plate 10 and the second plated steel plate 20 include the first alloy composition, or the first plated steel plate 10 and the second plated steel plate 20 include the third alloy composition, and thus, the ingredients of the first plated steel plate 10 and the second plated steel plate 20 are the same), the minimum hardness of the joint 30 after hot stamping may be greater than the minimum hardness of the first base steel 12 and the average hardness of the second base steel 22 after hot stamping. In addition, when the aluminum-based plated blank 100 includes combination of heterogeneous steel plates (e.g., the case where the first plated steel plate 10 and the second plated steel plate 20 include the second alloy composition and the third alloy composition, respectively, or the first plated steel plate 10 and the second plated steel plate 20 include the first alloy composition, and thus, the ingredients of the first plated steel plate 10 and the second plated steel plate 20 are different), the minimum hardness of the joint 30 after hot stamping may be greater than the minimum hardness of a steel plate having a smaller tensile strength among the first base steel 12 and the second base steel 22 after hot stamping.

Because the minimum hardness of the joint 30 is provided to be greater than the minimum hardness of the first and second base steels 12 and 22 after hot stamping, the occurrence of breakage of the joint 30 may be prevented or minimized.

In an exemplary embodiment, the value obtained by multiplying the thickness of the joint 30 and the tensile strength of the joint 30 after hot stamping may be greater than at least one of a value obtained by multiplying the thickness of the first plated steel plate 10 and the tensile strength of the first plated steel plate 10 after hot stamping, and a value obtained by multiplying the thickness of the second plated steel plate 20 and the tensile strength of the second plated steel plate 20 after hot stamping.

Specifically, when the aluminum-based plated blank 100 includes a combination of steel plates having the homogenous ingredients (e.g., the case where the first plated steel plate 10 and the second plated steel plate 20 include the first alloy composition, or the first plated steel plate 10 and the second plated steel plate 20 include the third alloy composition, and thus, the ingredients of the first plated steel plate 10 and the second plated steel plate 20 are the same), a value obtained by multiplying the maximum value in the thickness of the joint 30 and the tensile strength of the joint 30 after hot stamping may be greater than a value obtained by multiplying the thickness of a plated steel plate having a smaller thickness and the tensile strength of the plated steel plate after hot stamping among the first plated steel plate 10 and the second plated steel plate 20. Specifically, when the aluminum-based plated blank 100 includes a combination of steel plates having the heterogenous ingredients (e.g., the case where the first plated steel plate 10 and the second plated steel plate 20 respectively include the second alloy composition and the third alloy composition, or the first plated steel plate 10 and the second plated steel plate 20 include the first alloy composition, and thus, the ingredients of the first plated steel plate 10 and the second plated steel plate 20 are different from each other), a value obtained by multiplying the maximum value in the thickness of the joint 30 and the tensile strength of the joint 30 after hot stamping may be greater than a value obtained by multiplying the thickness of the first plated steel plate 10 and the tensile strength of the first plated steel plate 10 after hot stamping, and be greater than a value obtained by multiplying the thickness of the second plated steel plate 20 and the tensile strength of the second plated steel plate 20 after hot stamping.

In an exemplary embodiment, the first plated steel plate 10 and the second plated steel plate 20 may be different from each other in at least one of strength and thickness. In this case, at the time of bonding the first plated steel sheet 10 to the second plated steel sheet 20, the kind and/or amount of the ingredient to penetrate into the joint 30 from the first base steel 12, the first plated layer 14, the second base steel 22, and the second plated layer 24 may be different depending on the strength and thickness of the first plated steel plate 10 and the second plated steel plate 20. On the other hand, to prevent ferrite from being formed or excessively formed in the joint 30 at an Ac3 temperature or higher, the pillar wire 200 may include varied content of the ingredient by taking into account the ingredient penetrating from the first plated steel plate 10 and the second plated steel plate 20, particularly, the first plated layer 14 and the second plated layer 24 while the first plated steel plate 10 is bonded to the second plated steel plate 20, and as a result, the content of the austenite stabilizing element included in the joint 30 may vary.

In an exemplary embodiment, when the aluminum-based plated blank 100 includes a combination of steel plates having the homogenous ingredients (e.g., the case where the first plated steel plate 10 and the second plated steel plate 20 include the first alloy composition, or the first plated steel plate 10 and the second plated steel plate 20 include the third alloy composition, and thus, the ingredients of the first plated steel plate 10 and the second plated steel plate 20 are the same), the joint 30 may include an ingredient-based material in which ferrite is not formed at an Ac3 temperature or higher of the first plated steel plate 10 and the second plated steel plate 20. Preferably, the joint 30 may include an ingredient-based material in which ferrite is not formed at 840° C. or higher. Specifically, after going through a hot stamping process of heating the aluminum-based plated blank 100 to 850 to 1000° C., then, performing press molding, and performing rapid cooling at an average cooling rate of 10 to 500° C./s, the joint 30 may have an ingredient that may include a microstructure including martensite and the remainder of other unavoidable structures at an area fraction of 90% or greater. For example, at the hot stamping heating temperature, the joint 30 may be in a full austenite structure, and then may be transformed into a martensitic structure in an area fraction of 90% or greater, preferably a full martensitic structure upon cooling.

In an exemplary embodiment, when the aluminum-based plated blank 100 includes a combination of steel plates having the heterogeneous ingredients (e.g., the case where the first plated steel plate 10 and the second plated steel plate 20 respectively include the second alloy composition and the third alloy composition, or the first plated steel plate 10 and the second plated steel plate 20 include the first alloy composition, and thus, the ingredients of the first plated steel plate 10 and the second plated steel plate 20 are different from each other), the joint 30 may include an ingredient-based material in which ferrite is formed at a greater Ac3 temperature or higher of an Ac3 temperature of the first plated steel plate 10 and an Ac3 temperature of the second plated steel plate 20. Specifically, the joint 30 after the hot stamping process may have a microstructure including martensite, ferrite, and the remainder of other unavoidable structures.

Hereinafter, a method of manufacturing the aluminum-based plated blank 100 is described with reference to FIGS. 2A and 2B.

The method of manufacturing the aluminum-based plated blank 100 according to an exemplary embodiment may include a step of disposing the edges of the first plated steel plate 10 and the second plated steel plate 20 to face each other, and a bonding step of providing the pillar wire 200 to a boundary between the first plated steel plate 10 and the second plated steel plate 20, and irradiating a laser beam 310 to form the joint 30 connecting the first plated steel plate 10 and the second plated steel plate 20.

In an exemplary embodiment, the lateral surface of the first plated steel plate 10 and the lateral surface of the second plated steel plate 20 may be disposed to face each other. In this case, the lateral surface of the first plated steel plate 10 and the lateral surface of the second plated steel plate 20 may contact each other.

In an exemplary embodiment, the pillar wire 200 may be provided to the boundary between the first plated steel plate 10 and the second plated steel plate 20, a laser head 300 may irradiate the laser beam 310 to form the joint 30 connecting the first plated steel plate 10 and the second plated steel plate 20 in the boundary portion between the first plated steel plate 10 and the second plated steel plate 20.

The joint 30 is formed by melting the first plated steel plate 10, the second plated steel plate 20, and the filler wire 200 by using the laser beam 310, and through this process, the ingredients of the first plated layer 14 of the first plated steel plate 10 and the second plated layer 24 of the second plated steel plate 20 may penetrate into the joint 30. Accordingly, the composition of the pillar wire 200 should be determined by taking into account the penetration of the ingredients of the first plated layer 14 and the second plated layer 24 during laser welding.

In an exemplary embodiment, the pillar wire 200 may include an austenite stabilizing element. As an example, the pillar wire 200 may include one or greater austenite stabilizing elements of carbon (C) and manganese (Mn), the remainder of iron (Fe), and unavoidable impurities. In this case, the content of carbon (C) in the pillar wire 200 may be 0.1 wt % or greater and 1.0 wt % or less, and the content of manganese (Mn) may be 0.1 wt % or greater and 10.0 wt % or less. The pillar wire 200 may penetrate into the joint 30, and the ingredients of the joint 30 may be adjusted.

In an exemplary embodiment, the pillar wire 200 may include carbon (C) in an amount of 0.1 wt % or greater and 1.0 wt % or less, silicon (Si) in an amount of 0.1 wt % or greater to 2.0 wt % or less, manganese (Mn) in an amount of 0.1 wt % or greater to 10.0 wt % or less, phosphorus (P) in an amount of greater than 0 and 0.1 wt % or less, sulfur (S) in an amount greater than 0 and less than or equal to 0.1 wt %, the balance of iron (Fe), and other unavoidable impurities. Preferably, the pillar wire 200 may include carbon (C) in an amount of 0.4 wt % or greater and 0.9 wt % or less, silicon (Si) in an amount of 0.15 wt % or greater to 0.35 wt % or less, manganese (Mn) in an amount of 0.3 wt % or greater to 4.5 wt % or less, phosphorus (P) in an amount greater than 0 and 0.03 wt % or less, sulfur (S) in an amount of greater than 0 and 0.03 wt % or less, the balance of iron (Fe), and other unavoidable impurities.

The pillar wire 200 may include an amount of 0.1 wt % or greater and 1.0 wt % or less of carbon (C). Preferably, the pillar wire 200 may include an amount of 0.4 wt % or greater and 0.9 wt % or less of carbon (C). When the carbon (C) content included in the pillar wire 200 is less than 0.4 wt %, because the joint 30 is softened and the hardness of the joint 30 is less than those of the first plated steel plate 10 and the second plated steel plate 20, breakage may occur in the joint 30. On the other hand, when the carbon (C) content included in the pillar wire 200 is greater than 0.9 wt %, brittle fracture may occur in the joint 30.

The pillar wire 200 may include an amount of 0.1 wt % or greater and 2.0 wt % or less of silicon (Si). Preferably, the pillar wire 200 may include an amount of 0.15 wt % or greater and 0.35 wt % or less of silicon (Si). When the content of silicon (Si) included in the pillar wire 200 is less than 0.15 wt %, brittle fracture may occur in the joint 30. On the other hand, when the carbon (Si) content included in the pillar wire 200 is greater than 0.35 wt %, slag may occur on the surface of the bead.

The pillar wire 200 may include an amount of 0.1 wt % or greater and 10.0 wt % or less of manganese (Mn). Preferably, the pillar wire 200 may an amount of include 0.3 wt % or greater and 4.5 wt % or less of manganese (Mn). When the manganese (Mn) content included in the pillar wire 200 is less than 0.3 wt %, because the joint 30 is softened and the hardness of the joint 30 is less than those of the first plated steel plate 10 and the second plated steel plate 20, breakage may occur in the joint 30. On the other hand, when the manganese (Mn) content included in the pillar wire 200 is greater than 4.5 wt %, brittle fracture may occur in the joint 30.

The pillar wire 200 may include an amount greater than 0 and 0.1 wt % or less of phosphorus (P). Preferably, the pillar wire 200 may include an amount greater than 0 and 0.03 wt % or less of phosphorus (P). When the phosphorus (P) content included in the pillar wire 200 is greater than 0.03 wt %, brittle fracture due to segregation may occur.

The pillar wire 200 may include an amount greater than 0 and 0.1 wt % or less of sulfur (S). Preferably, the pillar wire 200 may include an amount greater than 0 and 0.03 wt % or less of sulfur (S). When the content of sulfur (S) included in the pillar wire 200 is greater than 0.03 wt %, cracks may occur due to formation of inclusions.

Specifically, even though the aluminum (Al) of the first plated layer 14 and the second plated layer 24 is mixed in the molten pool of the joint 30, the joint 30 may have a martensitic structure of 90% or greater by area fraction after hot stamping, preferably a full martensitic structure due to the austenite stabilizing element added to the pillar wire 200. That is, according to the present invention, without removing the first plated layer 14 and the second plated layer 24, even though the ingredients of the first plated layer 14 and the second plated layer 24 are mixed into the joint 30, the hardness and strength of the joint 30 may be prevented from being deteriorated, and thus, fracture of the joint 30 may be prevented.

In addition, when the ingredients of the first plated steel plate 10 and the second plated steel plate 20 are different from each other, even though the aluminum (Al) of the first plated layer 14 and the second plated layer 24 is mixed in the molten pool of the joint 30, fracture in the joint 30 may be prevented by suppressing the microstructure of the joint 30 after hot stamping from excessively including ferrite due to the austenite stabilizing element added to the pillar wire 200.

On the other hand, even when the penetration ingredient of the first plated layer 14 and the second plated layer 24 is diluted by using the pillar wire 200, the ingredient of the pillar wire 200, and the first plated layer 14 and the second plated layer 24 may not be evenly distributed in the ingredients of the first base steel 12 and the second base steel 22 depending on the bonding condition. To prevent this, while the first plated steel plate 10 and the second plated steel plate 20 are bonded to each other, the laser beam 310 may be irradiated to form a pattern of a preset angle with respect to a formation direction of the joint 30.

In an exemplary embodiment, the pattern may be formed by movement of one or greater of the first plated steel plate 10, the second plated steel plate 20, and the laser head 300 while the laser beam 310 is irradiated.

As an example, the laser beam 310 performs a pattern movement at a preset angle with respect to the direction in which the joint 30 is formed, and forms the joint 30 by melting the pillar wire 200, the first plated steel plate 10 and the second plated steel plate 20.

In addition, the joint 30 may be formed by movement of one or greater of the first plated steel plate 10, the second plated steel plate 20, and the laser head 300 while the laser beam 310 is irradiated with a pattern movement. In the present specification, a relative movement means that one or greater of the first plated steel plate 10, the second plated steel plate 20, and the laser head 300 while the laser head 300 move. Preferably, the joint 30 may be formed by movement of the laser head 300 with the first plated steel plate 10 and the second plated steel plate 20 in a stationary state.

In an exemplary embodiment, FIG. 2A schematically shows a process of forming the joint 30 by pattern movement of the first plated steel plate 10 and the second plated steel plate 20. Referring to FIG. 2A, with the laser head 300 fixed, the pillar wire 200 may be supplied toward portions of the first plated steel plate 10 and the second plated steel plate 20 facing each other, and the laser beam 310 may be irradiated. On the other hand, while the first plated steel plate 10 and the second plated steel plate 20 move in parallel to a direction D1 opposite to a direction Y2 in which the joint 30 is formed, and simultaneously, a pattern movement is performed such that a movement path Y1 of the laser beam 310 forms a preset angle with respect to the formation direction Y2 of the joint 30, and the laser beam 310 is irradiated to form the joint 30.

In an exemplary embodiment, FIG. 2B schematically shows a process of forming the joint 30 while the laser head 300 moves. Referring to FIG. 2B, with the first plated steel plate 10 and the second plated steel plate 20 in a stationary state, the pillar wire 200 is supplied toward the portions of the first plated steel plate 10 and the second plated steel plate 20 facing each other, and the laser head 300 may move and the laser beam 310 may be irradiated. In this case, the laser head 300 may move in parallel to the same direction D2 as the direction Y2 in which the joint 30 is formed, and simultaneously, a pattern movement may be performed such that the movement path Y1 of the laser beam 310 forms a preset angle with respect to the formation direction Y2 of the joint 30, and the laser beam 310 may be irradiated to form the joint 30. The laser beam 310 may perform a pattern movement of 45° or greater and less than 90° with respect to the joint formation direction Y2.

In FIG. 2B, the laser beam 310 may move in a direction different from the movement direction D2 of the laser head 300. Preferably, the movement direction of the laser beam 310 may form a preset angle with respect to the movement direction D2 of the laser head 300.

In an exemplary embodiment, the movement direction of the laser beam 310 may be a direction perpendicular to the movement direction D2 of the laser head 300. Alternatively, the laser beam 310 may perform a pattern movement while forming an angle of 45° or greater and less than 90° with respect to the movement direction D2 of the laser head 300.

As a result, the laser beam 310 may be irradiated while performing a pattern movement having a predetermined angle with the formation direction Y2 of the joint 30. Accordingly, compared to the case where the laser beam 310 is irradiated in the same direction as the formation direction Y2 of the joint 30, a movement distance of the laser beam 310 on the surface of the first plated steel plate 10 and the second plated steel plate 20 is further lengthened, an area through which energy of the laser beam 310 may be transferred to the first plated steel plate 10 and the second plated steel plate 20 is widened, and regions to which the energy is transferred may overlap each other depending on the movement path Y1 of the laser beam 310 and the size of the radius of the laser beam 310. Accordingly, the ingredient of the first plated layer 14, the ingredient of the second plated layer 24, and the ingredient of the pillar wire 200 may be sufficiently diluted in the ingredients of the first base steel 12 and the second base steel 22 to form the joint 30.

In an exemplary embodiment, the laser beam 310 may have a frequency of 100 to 1500 Hz and a power of 1 to 20 kW. In an embodiment, the power of the laser beam 310 may mean an output value of the laser oscillator, and the frequency of the laser beam 310 may mean a frequency of the pattern movement of the laser beam 310.

In an exemplary embodiment, when the aluminum-based plating blank 100 is manufactured, the forming speed of the joint 30 should be 1 m/min or greater, the laser frequency should be 1500 Hz or less, and the power of the laser beam 310 should be 20 kW or less to secure minimum productivity and business feasibility. The higher the laser frequency and the power of the laser beam 310, the better, but in order to implement a frequency exceeding 1500 Hz and power exceeding 20 kW, because a high-performance facility is required, the size of the facility increases and the cost of the facility increases. In addition, in order to secure the minimum productivity, it is required to maintain the forming speed of the joint 30 at 1 m/min or greater. The forming speed of the joint 30 refers to the displacement per unit time in which the laser head 300 relatively moves in parallel to the joint-forming direction Y2.

In an exemplary embodiment, the forming speed of the joint 30 may be 1 to 10 m/min. When the forming speed of the joint 30 exceeds 10 m/min, even though the laser beam 310 is irradiated under the conditions of frequencies of 100 to 1500 Hz, power of 1 to 20 kW, and a beam radius of 0.1 to 1.0 mm, an angle between the movement path Y1 of the laser beam 310 and the direction Y2 in which the joint 30 is formed increases, when the first plated layer 14, the second plated layer 24, the first base steel 12, and the second base steel 22 are melted by the laser beam 310, there may be a portion in which the ingredients of the first plated layer 14 and the second plated layer 24 are not sufficiently diluted in the ingredients of the first base steel 12, and the second base steel 22.

In an exemplary embodiment, the forming speed of the joint 30 may be 15 to 170 mm/sec. Preferably, the forming speed of the joint 30 may be 1 to 7 m/min. Greater preferably, the forming speed of the joint 30 may be 15 to 120 mm/sec.

In an exemplary embodiment, the radius of the laser beam 310 may be 0.1 to 1.0 mm. In order for the radius of the laser beam 310 to exceed 1.0 mm, the distance between the pillar wire 200 and the first and second plated steel plates 10 and 20 and the laser head 300 should be close. In this case, a space to which the pillar wire 200 is supplied, or a space for replacing the pillar wire 200 in the case where the pillar wire 200 is consumed, is not sufficient, and thus the efficiency of the manufacturing process may be reduced. On the other hand, when the radius of the laser beam 310 is less than 0.1 mm, as shown in FIG. 3, there may be a region S to which the laser beam 310 is not irradiated. Referring to FIG. 3, when the laser beam radius is less than 0.1 mm, even though the laser beam is irradiated under conditions of a frequency of 100 to 1500 Hz and a power of 1 to 20 kW, because the radius of the laser beam is small, there may be a region S in which the laser beam 310 is not irradiated.

On the other hand, when the frequency of the laser beam 310 is less than 100 Hz, because an interval between spots of the laser beam 310 increases, even though the conditions of the laser beam power of 1 to 20 kW, the radius of the beam 310 of 0.1 to 1.0 mm, and the speed of forming the joint 30 of 1 to 7 m/min are satisfied, when the laser beam 310 is irradiated, there may be a portion in which the ingredients of the first plated layer 14 and the second plated layer 24 are not sufficiently diluted in the ingredients of the first base steel 12 and the second base steel 22.

In addition, when the power of the laser beam 310 is less than 1 kW, even though the conditions of the frequency of the beam 310 of 100 to 1500 Hz, the radius of the laser beam 310 of 0.1 to 1.0 mm, and the speed of forming the joint 30 of 1 to 7 mm/min are satisfied, energy transferred to the first plated steel plate 10 the second plated steel plate 20 is sufficient, and thus, even though the laser beam 310 is irradiated, there may be a portion in which the ingredients of the first plated layer 14 and the second plated layer 24 are not sufficiently diluted in the ingredients of the first base steel 12 and the second base steel 22.

In an exemplary embodiment, while the laser beam 310 is irradiated, a first laser beam and a second laser beam apart from each other may be irradiated. As an example, the first laser beam melts the pillar wire 200, the first plated layer 14, the second plated layer 24, the first base steel 12, and the second base steel 22, and the second laser beam maintains the molted state, and thus, the melted portion may be uniformly agitated, the occurrence of the segregation of the joint 30 may be prevented, and the quality and mechanical properties may be excellent. Meanwhile, when the first laser beam and the second laser beam are used, a sum of the powers of the first laser beam and the second laser beam may be 1 to 20 kW.

Meanwhile, when the aluminum-based plated blank 100 is bonded within the above-described range of the laser beam power, radius, frequency, and speed of forming the joint 30, and then heat treatment of heating at high temperature and rapidly cooling the aluminum based plated blank is performed, the average hardness of the joint 30 may be greater than at least one of the average hardnesses of the first base steel 12 and the second base steel 22, and preferably, a minimum hardness of the joint 30 may be greater than a minimum hardness of the first base steel 12 and the second base steel 22.

Specifically, when the aluminum-based plated blank 100 includes a combination of steel plates having the homogenous ingredients (e.g., the case where the first plated steel plate 10 and the second plated steel plate 20 include the first alloy composition, or the first plated steel plate 10 and the second plated steel plate 20 include the third alloy composition, and thus, the ingredients of the first plated steel plate 10 and the second plated steel plate 20 are the same), the minimum hardness of the joint 30 after hot stamping may be greater than the minimum hardness of the first plated steel plate 12 and the second base steel 22 after hot stamping. In addition, when the aluminum-based plated blank 100 includes combination of heterogeneous steel plates (e.g., the case where the first plated steel plate 10 and the second plated steel plate 20 include the second alloy composition and the third alloy composition, respectively, or the first plated steel plate 10 and the second plated steel plate 20 include the first alloy composition, and thus, the ingredients of the first plated steel plate 10 and the second plated steel plate 20 are different), the average hardness of the joint 30 after hot stamping may be greater than a minimum hardness of a steel plate having a smaller tensile strength among the first base steel 12 and the second base steel 22 after hot stamping.

In an exemplary embodiment, a speed of forming the joint 30 may be 15 to 120 mm/sec, a frequency of the laser beam 310, a radius of the laser beam 310, and the speed of forming the joint 30 may satisfy relationship of Inequality 1 below.

$$\left(\frac{f \times r}{v}\right)^{\alpha} \geq 1 \qquad \text{[Inequality 1]}$$

In Inequality 1, $\alpha$ is 0.7, f is a frequency (Hz) of the laser beam, r is a radius (mm) of the laser beam measured on the surface of the plated steel plate, and v is a speed (mm/sec) of forming the joint.

Even though the frequency, power, radius of the laser beam 310, and the speed of forming the joint 30 in Inequality 1 are controlled, to secure sufficient tensile strength of the joint 30, segregation area fraction of aluminum (Al) should be reduced. For this purpose, not only the frequency, power, radius of the laser beam 310, and the speed of forming the joint 30, but also a number of variables such as energy loss occurring while the laser beam 310 is irradiated from the laser head 300 and transmitted to the first plated steel plate 10 and the second plated steel plate 20, the heat reflectance of the first plated layer 14 and the second plated layer 24, the thermal conductivity of the first plated steel plate 10 and the second plated steel plate 20, the thickness of the first base steel 12 and the second base steel 22, and the thickness of the first plated layer 14 and the second plated layer 24 should be taken into account.

In addition, when controlling the radius of the laser beam 310, there is a difficulty in that energy should be transferred to the joint 30 by taking into account not only the energy density at the surface of the first plated steel plate 10 and the second plated steel plate 20, but also a movement path of the laser beam 310 at the surface of the first plated steel plate 10 and the second plated steel plate 20 determined depending on the frequency of the laser beam 310 and the speed of forming the joint 30.

Accordingly, the present inventors derived conditions for securing sufficient tensile strength of the joint 30 by using only the frequency and radius of the laser beam 310 and the speed of forming the joint 30 by using a correction coefficient $\alpha$ that takes into account the various situations described above through excessively repeated experiments.

When the condition according to Inequality 1 is satisfied, the aluminum (Al) segregation area fraction may be reduced to 5% or less. However, in this case, it is preferable that the speed of forming the joint 30 is 1 to 7 m/min, and greater preferably, the speed of forming the joint 30 may be 15 to 120 mm/sec. When the speed of forming the joint 30 is fast, there is a problem in that the time for evenly transmitting energy to the joint 30 is insufficient. As an example, under the conditions of the speed of forming the joint 30 of 120 to 170 mm/s, aluminum (Al) segregation of the joint may be excessively generated even when Inequality 1 is satisfied.

Meanwhile, even though the aluminum (Al) segregation area fraction of the joint 30 satisfies 5% or less, when aluminum (Al) segregation occurs in the interface between the joint 30 and the first base steel 12 and in the interface between the joint 30 and the second base steel 22, there is a high possibility that fracture occurs in the joint 30, specifically, at the interface between the joint 30 and the first plated steel plate 10 and the interface between the joint 30 and the second plated steel plate 20.

In an exemplary embodiment, when the pattern angle of the laser beam 310 is 45° or greater and less than 90°, aluminum (Al) segregation may be prevented from occurring at the interface between the joint 30 and the first plated steel plate 10 and the interface between the joint 30 and the second plated steel plate 20. The pattern angle means an angle formed by the direction Y2 in which the joint 30 is formed and the movement path Y1 of the laser beam on the surfaces of the first plated steel plate 10 and the second plated steel plate 20 while the joint 30 is formed.

Figure 4:
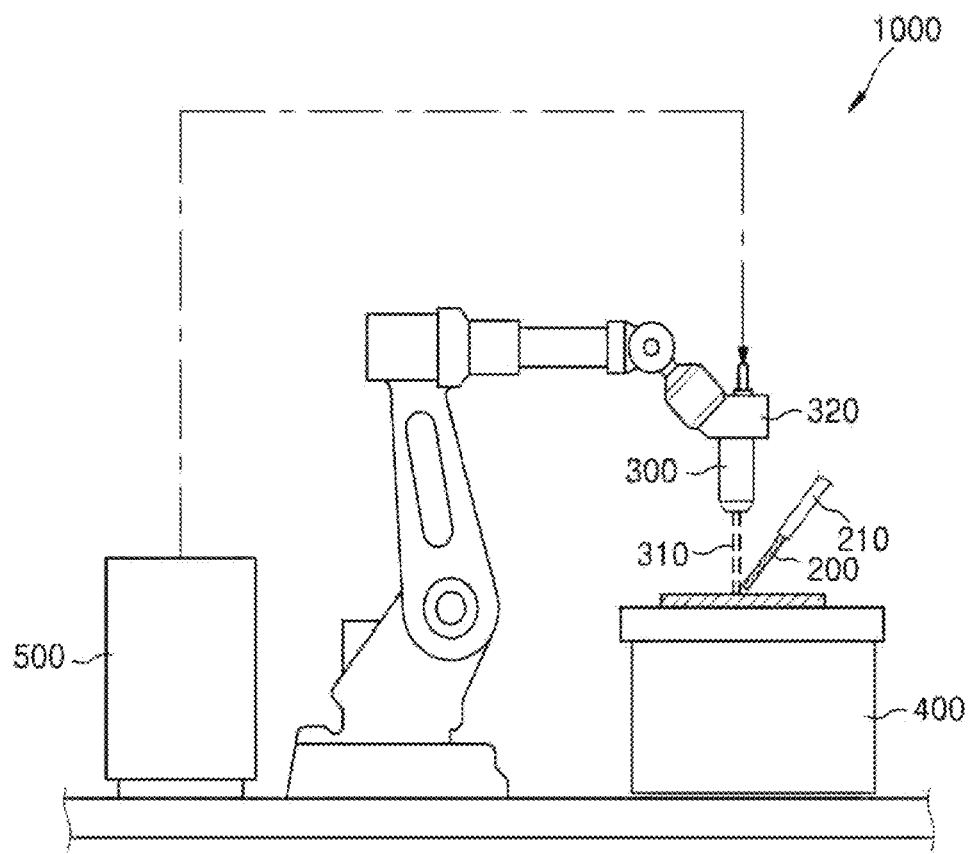
FIG. 4 is a cross-sectional view schematically showing an apparatus for manufacturing an aluminum-based plated blank according to an exemplary embodiment.

FIG. 4 is a cross-sectional view schematically showing an apparatus for manufacturing an aluminum-based blank according to an embodiment.

Referring to FIG. 4, the apparatus 1000 for manufacturing the aluminum-based plated blank includes a laser oscillator 500 for generating a laser light source, a steel plate loading unit 400 on which two or more aluminum-based plated steel plates are disposed, wherein the edge of one aluminum-based plated steel plate and the other aluminum-based plated steel plate are disposed to face each other, a wire supplier 210 for supplying the pillar wire 200 for forming the joint of the aluminum-based plated steel plate, and a laser head 300 for irradiating the laser beam 310 to the portions of the aluminum-based plated steel plate facing each other and the pillar wire 200 supplied by using the laser light source supplied from the laser oscillator 500. In this case, the aluminum-based plated steel plate may be the first plated steel plate 10 (FIG. 1A) and the second plated steel plate 20 (FIG. 1A) described above.

In an embodiment, the laser head 300 is fastened to a robot arm 320 and may move in a direction opposite to the direction in which the joint is formed.

In an exemplary embodiment, the aluminum-based plated steel plate may be moved in the same direction as the direction in which the joint is formed by using the steel plate loading unit 400.

While the steel plates are joined, the laser beam 310 is irradiated to form a pattern of a preset angle with respect to the direction in which the joint is formed, and the laser beam 310 may have a frequency of 100 to 1500 Hz and a power of 1 to 20 kW. The speed of forming the joint may be 1 to 10 m/min, preferably 15 to 170 mm/sec.

In an exemplary embodiment, the pattern may be formed by pattern movement of one or more of the aluminum-based plated steel plate and the laser beam 310 of the steel sheet loading unit.

Hereinafter, the configuration and operation of the present invention will be described in more detail through preferred embodiments of the present invention. However, these are presented as preferred examples of the present invention and cannot be construed as limiting the present invention in any sense.

Experimental Example 1

Two or more aluminum-based plated steel sheets having different strengths and thicknesses were prepared, wherein each aluminum-based plated steel plate includes a base steel and a plated layer formed in an adhesion amount of 20-100 g/m² on at least one surface of the base steel, each aluminum-based plated steel plate including 0.01 wt % or greater and 0.5 wt % or less of carbon (C), 0.01 wt % or greater and 1.0 wt % or less of silicon (Si), 0.3 wt % or greater and 2.0 wt % or less of manganese (Mn), greater than 0 and 0.1 wt % of phosphorus (P), greater than 0 and 0.1 wt % or less of sulfur (S), the remainder of iron (Fe), and other unavoidable impurities. The plated layer of the aluminum-based plated steel plate included a surface layer and a diffusion layer, the surface layer being formed on the surface of the base steel and containing 80 wt % or greater of aluminum (Al), and the diffusion layer being formed between the surface layer and the base steel, containing aluminum-iron (Al—Fe) and aluminum-iron-A silicon (Al—Fe—Si) compound, and containing 20 to 60 wt % of iron (Fe).

In addition, among two or more aluminum-based plated steel plates, the edge of one plated steel plate and the edge of another plated steel plate were disposed to face each other on the steel plate loading unit of the apparatus for manufacturing the aluminum-based plated blank shown in FIG. 4. Next, the pillar wire was provided from the wire supplier to the portions of the aluminum-based plated steel plate facing each other, and the aluminum-based plated blank was manufactured by irradiating the laser beam to melt the portions of the aluminum-based plated steel plate facing each other and the pillar wire and form the joint.

While the steel plates are joined, the laser beam was irradiated to form a pattern of a preset angle with respect to the direction in which the joint is formed. Specifically, while the laser head moved in parallel to the same direction as the direction in which the joint is formed, the laser beam was irradiated while performing a pattern movement at 60° with respect to the direction in which the joint is formed. In addition, the laser beam was irradiated with a frequency of 100 Hz, a beam power of 1 kW, and a beam radius of 0.1 mm, and the joint was formed at a forming speed of 1 m/min.

Table 1 below shows the fracture occurrence portions during the tensile test after hot stamping according to the standard deviation of the aluminum content in the joint.

of the aluminum (Al) content of the first lateral portion 31, and the standard deviation of the aluminum (Al) content of the second lateral portion 33 satisfy the above-mentioned conditions, during a tensile test after hot-stamping the aluminum-based plating blank 100, it may be determined that fracture occurs in the plated steel plate (e.g., the first plated steel plate 10 and/or the second plated steel plate 20).

Comparative Example 1 and Comparative Example 3 are the cases where a standard deviation of aluminum (Al) content of the first lateral portion 31 exceeds 0.20. Even though other conditions are satisfied, when a standard deviation of aluminum (Al) content of the first lateral portion 31 exceeds 0.20, during a tensile test after hot-stamping the aluminum-based plating blank 100, it may be determined that fracture occurs in the joint 30.

Comparative Example 2 is the case where a standard deviation of aluminum (Al) content of the joint 30 exceeds 0.25. Even though other conditions are satisfied, when a standard deviation of aluminum (Al) content of the joint 30 exceeds 0.25, during a tensile test after hot-stamping the aluminum-based plating blank 100, it may be determined that fracture occurs in the joint 30.

Comparative Example 4 is the case where a standard deviation of aluminum (Al) content of the second lateral portion 33 exceeds 0.20. Even though other conditions are satisfied, when a standard deviation of aluminum (Al) content of the second lateral portion 33 exceeds 0.20, during a tensile test after hot-stamping the aluminum-based plating blank 100, it may be determined that fracture occurs in the joint 30.

Comparative Example 5 is the case where an average content of aluminum (Al) of the joint 30 exceeds 1.5 wt %. Even though other conditions are satisfied, when the average

TABLE 1

| Division | Average content of aluminum (wt %) | Standard deviation of the aluminum content of the joint | Standard deviation of the aluminum content of the first lateral portion | Standard deviation of the aluminum content of the second lateral portion | After hot stamping during tensile test fracture occurrence portion |
| --- | --- | --- | --- | --- | --- |
| Embodiment 1 | 0.5 | 0.11 | 0.08 | 0.16 | Plated steel plate |
| Embodiment 2 | 0.9 | 0.05 | 0.02 | 0.05 | Plated steel plate |
| Embodiment 3 | 1.50 | 0.25 | 0.20 | 0.16 | Plated steel plate |
| Comparative Example 1 | 0.60 | 0.25 | 0.21 | 0.16 | the joint |
| Comparative Example 2 | 1.50 | 0.26 | 0.04 | 0.08 | the joint |
| Comparative Example 3 | 1.40 | 0.23 | 0.22 | 0.04 | the joint |
| Comparative Example 4 | 1.50 | 0.12 | 0.02 | 0.21 | the joint |
| Comparative Example 5 | 1.60 | 0.06 | 0.08 | 0.07 | the joint |

As described above, the average content of aluminum (Al) in the joint 30 may be 0.5 wt % or greater and 1.5 wt % or less. In addition, the joint 30 may include the first lateral portion 31, the second portion 33, and the central portion 35, and the standard deviation of the aluminum (Al) content of the joint 30 is 0 or greater and 0.25 or less, and the standard deviation of the aluminum (Al) content of the first lateral portion 31 and the second lateral portion 33 may be 0 or greater and 0.20 or less.

Referring to Table 1, when the average content of aluminum (Al) in the joint 30, the standard deviation of the aluminum (Al) content in the joint 30, the standard deviation content of aluminum (Al) of the joint 30 exceeds 1.5 wt %, during a tensile test after hot-stamping the aluminum-based plating blank 100, it may be determined that fracture occurs in the joint 30.

Accordingly, when the average content of aluminum (Al) of the joint 30 is 0.5 wt % or greater and 1.5 wt % or less, and the standard deviation of the aluminum (Al) content of the joint 30 is 0 or greater and 0.25 or less, during a tensile test after hot-stamping the aluminum-based plating blank 100, the occurrence of fracture in the joint 30 may be prevented or minimized. Particularly, because a standard deviation of aluminum (Al) content of a portion adjacent to the first plated steel plate 10 and the joint 30 (e.g., the first lateral portion 31) and a portion adjacent to the second plated steel plate 20 and the joint 30 (e.g., the second lateral portion 33), is 0 or greater and 0.2 or less, the aluminum (Al) is evenly distributed in the first lateral portion 31 and the second lateral portion 33, and the occurrence of breakage between the plated steel plate 10 and the joint 30 and between the second plated steel plate 20 and the joint 30 may be prevented or minimized.

Experimental Example 2

An aluminum-based plated blank was manufactured in the same method as in Experimental Example 1, except that the aluminum-based plated steel plate was joined by applying the conditions of the laser beam power, beam radius, frequency, and joint-forming speed of Table 2 below.

After manufacturing three aluminum-based plated blank specimens of embodiments 4 to 19 and Comparative Examples 6 to 17, respectively, each specimen was heated to an austenite single-phase region temperature or higher (Ac3 or higher), and after cooling each specimen to 300° C. at a cooling rate of 10 to 500° C./s, the hardness values of the joint of the aluminum-based plated blank and the aluminum-plated steel plate were measured. Here, the hardness was measured by the Vickers hardness test method (load 300 g) of metal materials, and when the minimum hardness of the joint is greater than or equal to the minimum hardness of the plated steel plate, it was determined as Pass, and when the minimum hardness is less than the minimum hardness, it was determined as Fail, and the results are shown in Table 2 below. In addition, the minimum hardness of the joint is the smallest value among the hardness values of the joint measured at 5 points spaced apart at regular intervals, and the minimum hardness of the plated steel plate (or base steel) is the smallest value among the hardness values of the plated steel plate (or base steel) measured at 5 points spaced apart at regular intervals.

TABLE 2

| Division | Beam power (kW) | Beam radius (mm) | Frequency (Hz) | The joint-forming speed (m/min) | Hardness test results (Pass/Fail) |
| --- | --- | --- | --- | --- | --- |
| Embodiment 4 | 1 | 0.1 | 100 | 1 | Pass |
| Embodiment 5 | 1 | 0.1 | 1500 | 1 | Pass |
| Embodiment 6 | 1 | 0.1 | 100 | 10 | Pass |
| Embodiment 7 | 1 | 0.1 | 1500 | 10 | Pass |
| Embodiment 8 | 1 | 1 | 100 | 1 | Pass |
| Embodiment 9 | 1 | 1 | 1500 | 1 | Pass |
| Embodiment 10 | 1 | 1 | 100 | 10 | Pass |
| Embodiment 11 | 1 | 1 | 1500 | 10 | Pass |
| Embodiment 12 | 1 | 0.32 | 100 | 1 | Pass |
| Embodiment 13 | 1 | 0.32 | 1500 | 10 | Pass |
| Embodiment 14 | 10 | 1 | 100 | 1 | Pass |
| Embodiment 15 | 10 | 1 | 1500 | 10 | Pass |
| Embodiment 16 | 20 | 0.1 | 100 | 1 | Pass |
| Embodiment 17 | 20 | 0.1 | 1500 | 1 | Pass |
| Embodiment 18 | 20 | 0.1 | 100 | 10 | Pass |
| Embodiment 19 | 20 | 0.1 | 1500 | 10 | Pass |
| Comparative Example 6 | 1 | 0.05 | 100 | 1 | Fail |
| Comparative Example 7 | 1 | 0.05 | 1500 | 1 | Fail |
| Comparative Example 8 | 1 | 0.1 | 90 | 1 | Fail |
| Comparative Example 9 | 1 | 1 | 90 | 1 | Fail |
| Comparative Example 10 | 1 | 1 | 100 | 11 | Fail |
| Comparative Example 11 | 1 | 1 | 1500 | 11 | Fail |
| Comparative Example 12 | 20 | 0.05 | 100 | 1 | Fail |
| Comparative Example 13 | 20 | 0.05 | 1500 | 1 | Fail |
| Comparative Example 14 | 20 | 0.1 | 90 | 1 | Fail |
| Comparative Example 15 | 20 | 1 | 90 | 1 | Fail |
| Comparative Example 16 | 20 | 1 | 100 | 11 | Fail |
| Comparative Example 17 | 20 | 1 | 1500 | 11 | Fail |

Hereinafter, in the present invention, "energy density" is assumed to be "a value obtained by dividing the beam power P (kW) of the laser oscillator by the laser beam area ($\pi \cdot r^2$) on the surface of the steel plate (where r is the radius of the laser beam)".

Referring to the results of Table 2, in the case of embodiments 4 to 19 that satisfy the laser beam irradiation and the joint-forming speed of the present invention, it is determined that the minimum hardness of the joint is greater than or equal to the minimum hardness of the plated steel plate (or base steel).

Referring to the results of Table 2, in the case of embodiments 4 to 19 that satisfy the laser beam irradiation and the joint-forming speed of the present invention, it is determined that the minimum hardness of the joint is greater than or equal to the minimum hardness of the plated steel plate (or base steel).

On the other hand, in the case of Comparative Examples 6, 7, 12 and 13, the energy density is sufficient, but even when the joint-forming speed is minimized, because the radius of the laser beam is small, there was a portion in which the ingredients of the plated layer were not sufficiently diluted in the ingredient of the base steel, so that the minimum hardness of the joint was formed to be equal to or less than the minimum hardness of the plated steel plate (or base steel).

In Comparative Examples 8, 9, 14, and 15, even when the laser beam radius value was set to the maximum (1.0 mm) and the joint-forming speed was set to the minimum (1 m/min), because the frequency was low, the interval of the laser beam movement path was increased and there was a portion where the ingredients of the plated layer are not sufficiently diluted in the ingredient of the base steel when the plated layer and base steel of the aluminum-based steel plate are melted by the laser beam, so that the minimum hardness of the joint was formed to be equal to or less than the minimum hardness of the plated steel plate (or base steel).

In addition, in the case of Comparative Examples 10, 11, 16 and 17, the energy density is sufficient and the beam radius was set to the maximum, but because the speed is too fast, the interval of the movement path of the laser beam was increased and there was a portion in which the ingredients of the plated layer were not sufficiently diluted in the ingredient of the base steel when the plated layer and base steel of the aluminum-based steel plate are melted by the laser beam, so that the minimum hardness of the joint was formed to be equal to or less than the minimum hardness of the plated steel plate (or base steel).

Experimental Example 3

The laser beam power, beam radius, frequency, and joint-forming speed according to the following Tables 3 to 6 and the conditions according to Inequality 1 were applied to join the aluminum-based plated steel plates, and an aluminum-based plating blank was manufactured in the same method as in Experimental Example 1 above, except that the laser head moves in parallel to the same direction as the direction in which the joint is formed and the laser beam was irradiated while performing a pattern movement of 45° with respect to the direction in which the joint is formed.

$$\left(\frac{f \times r}{v}\right)^{\alpha} \geq 1 \qquad \text{[Inequality 1]}$$

In Inequality 1, α is 0.7, f is a frequency (Hz) of the laser beam, r is a radius (mm) of the laser beam measured on the surface of the plated steel plate, and v is a speed (mm/sec) of forming the joint.

After manufacturing three blank specimens of embodiments 20 to 71 and Comparative Examples 18 to 57, respectively, each specimen was heated to austenite single-phase temperature or higher (Ac3 or higher) and cooled to 300° C. or less at a cooling speed of 10-500° C./s. Then, the aluminum segregation area fraction of the joint of each specimen and the tensile test were performed, and the results are shown in Tables 3 to 6 below. Specifically, the measurement of the area fraction of aluminum (Al) segregation in the joint was expressed as an average value of the area fraction of Al segregation in three specimens. The results of the tensile test indicate that after tensile force is applied to the specimen, the case in which fracture does not occur at the joint in all three specimens is indicated as Pass, and the case in which fracture occurs at least once in the joint is indicated as Fail.

TABLE 3

| Division | Beam power (kW) | Joint-forming speed (m/min) | Beam radius (mm) | Frequency (Hz) | Inequality 1 (v:mm/sec) | Al segregation area fraction (%) | Tensile test results (Pass/Fail) |
|---|---|---|---|---|---|---|---|
| Embodiment 20 | 1 | 1 | 0.1 | 1500 | 4.66 | 4.2 | Pass |
| Embodiment 21 | 1 | 1 | 1 | 100 | 3.51 | 3.6 | Pass |
| Embodiment 22 | 1 | 1 | 1 | 1500 | 23.34 | 5 | Pass |
| Embodiment 23 | 1 | 3 | 0.1 | 1500 | 2.16 | 1.1 | Pass |
| Embodiment 24 | 1 | 3 | 0.4 | 130 | 1.03 | 1 | Pass |
| Embodiment 25 | 1 | 3 | 0.4 | 1500 | 5.7 | 3.1 | Pass |
| Embodiment 26 | 1 | 3 | 1 | 100 | 1.63 | 1.1 | Pass |
| Embodiment 27 | 1 | 3 | 1 | 1500 | 10.82 | 4.2 | Pass |
| Embodiment 28 | 1 | 5 | 0.1 | 1500 | 1.51 | 1.6 | Pass |
| Embodiment 29 | 1 | 5 | 1 | 100 | 1.14 | 1.2 | Pass |
| Embodiment 30 | 1 | 5 | 1 | 1500 | 7.57 | 3.9 | Pass |
| Embodiment 31 | 1 | 7 | 0.1 | 1500 | 1.2 | 1.3 | Pass |
| Embodiment 32 | 1 | 7 | 1 | 1500 | 5.98 | 3.3 | Pass |
| Comparative Example 18 | 1 | 1 | 0.1 | 100 | 0.7 | 18.7 | Fail |
| Comparative Example 19 | 1 | 1 | 0.1 | 160 | 0.98 | 18.3 | Fail |
| Comparative Example 20 | 1 | 3 | 0.1 | 100 | 0.33 | 14.2 | Fail |
| Comparative Example 21 | 1 | 3 | 0.4 | 100 | 0.86 | 13.6 | Fail |
| Comparative Example 22 | 1 | 5 | 0.1 | 100 | 0.23 | 11.2 | Fail |
| Comparative Example 23 | 1 | 7 | 0.1 | 100 | 0.18 | 19.2 | Fail |
| Comparative Example 24 | 1 | 7 | 1 | 100 | 0.9 | 14.5 | Fail |
| Comparative Example 25 | 1 | 8 | 0.1 | 1500 | 1.09 | 13.9 | Fail |
| Comparative Example 26 | 1 | 8 | 1 | 1500 | 5.45 | 15.7 | Fail |
| Comparative Example 27 | 1 | 10 | 1 | 1500 | 4.66 | 19.5 | Fail |

TABLE 4

| Division | Beam power (kW) | Joint-forming speed (m/min) | Beam radius (mm) | Frequency (Hz) | Inequality 1 (v:mm/sec) | Al segregation area fraction (%) | Tensile test results (Pass/Fail) |
|---|---|---|---|---|---|---|---|
| Embodiment 33 | 3 | 1 | 0.1 | 1500 | 4.66 | 4.9 | Pass |
| Embodiment 34 | 3 | 1 | 1 | 100 | 3.51 | 4.8 | Pass |
| Embodiment 35 | 3 | 1 | 1 | 1500 | 23.34 | 4.8 | Pass |

TABLE 4-continued

| Division | Beam power (kW) | Joint-forming speed (m/min) | Beam radius (mm) | Frequency (Hz) | Inequality 1 (v:mm/sec) | Al segregation area fraction (%) | Tensile test results (Pass/Fail) |
|---|---|---|---|---|---|---|---|
| Embodiment 36 | 3 | 3 | 0.1 | 1500 | 2.16 | 2.1 | Pass |
| Embodiment 37 | 3 | 3 | 0.4 | 130 | 1.03 | 0 | Pass |
| Embodiment 38 | 3 | 3 | 0.4 | 1500 | 5.7 | 3.9 | Pass |
| Embodiment 39 | 3 | 3 | 1 | 100 | 1.63 | 1.2 | Pass |
| Embodiment 40 | 3 | 3 | 1 | 1500 | 10.82 | 4.6 | Pass |
| Embodiment 41 | 3 | 5 | 0.1 | 1500 | 1.51 | 1.4 | Pass |
| Embodiment 42 | 3 | 5 | 1 | 100 | 1.14 | 0.9 | Pass |
| Embodiment 43 | 3 | 5 | 1 | 1500 | 7.57 | 3.1 | Pass |
| Embodiment 44 | 3 | 7 | 0.1 | 1500 | 1.2 | 1.2 | Pass |
| Embodiment 45 | 3 | 7 | 1 | 1500 | 5.98 | 3.9 | Pass |
| Comparative Example 28 | 3 | 1 | 0.1 | 100 | 0.7 | 15.1 | Fail |
| Comparative Example 29 | 3 | 1 | 0.1 | 160 | 0.98 | 14.6 | Fail |
| Comparative Example 30 | 3 | 3 | 0.1 | 100 | 0.33 | 12.8 | Fail |
| Comparative Example 31 | 3 | 3 | 0.4 | 100 | 0.86 | 17.7 | Fail |
| Comparative Example 32 | 3 | 5 | 0.1 | 100 | 0.23 | 16.3 | Fail |
| Comparative Example 33 | 3 | 7 | 0.1 | 100 | 0.18 | 16.1 | Fail |
| Comparative Example 34 | 3 | 7 | 1 | 100 | 0.9 | 14.1 | Fail |
| Comparative Example 35 | 3 | 8 | 0.1 | 1500 | 1.09 | 13.6 | Fail |
| Comparative Example 36 | 3 | 8 | 1 | 1500 | 5.45 | 11.6 | Fail |
| Comparative Example 37 | 3 | 10 | 1 | 1500 | 4.66 | 16.7 | Fail |

TABLE 5

| Division | Beam power (kW) | Joint-forming speed (m/min) | Beam radius (mm) | Frequency (Hz) | Inequality 1 (v:mm/sec) | Al segregation area fraction (%) | Tensile test results (Pass/Fail) |
|---|---|---|---|---|---|---|---|
| Comparative Example 38 | 7 | 1 | 0.1 | 100 | 0.7 | 14.2 | Fail |
| Comparative Example 39 | 7 | 1 | 0.1 | 160 | 0.98 | 16.7 | Fail |
| Comparative Example 40 | 7 | 3 | 0.1 | 100 | 0.33 | 15.2 | Fail |
| Comparative Example 41 | 7 | 3 | 0.4 | 100 | 0.86 | 11.6 | Fail |
| Comparative Example 42 | 7 | 5 | 0.1 | 100 | 0.23 | 11 | Fail |
| Comparative Example 43 | 7 | 7 | 0.1 | 100 | 0.18 | 11.2 | Fail |
| Comparative Example 44 | 7 | 7 | 1 | 100 | 0.9 | 12.6 | Fail |
| Comparative Example 45 | 7 | 8 | 0.1 | 1500 | 1.09 | 13.2 | Fail |
| Comparative Example 46 | 7 | 8 | 1 | 1500 | 5.45 | 17 | Fail |
| Comparative Example 47 | 7 | 10 | 1 | 1500 | 4.66 | 19.5 | Fail |
| Embodiment 46 | 7 | 1 | 0.1 | 1500 | 4.66 | 5 | Pass |
| Embodiment 47 | 7 | 1 | 1 | 100 | 3.51 | 4.1 | Pass |
| Embodiment 48 | 7 | 1 | 1 | 1500 | 23.34 | 4.9 | Pass |
| Embodiment 49 | 7 | 3 | 0.1 | 1500 | 2.16 | 1.1 | Pass |
| Embodiment 50 | 7 | 3 | 0.4 | 130 | 1.03 | 1 | Pass |
| Embodiment 51 | 7 | 3 | 0.4 | 1500 | 5.7 | 3.9 | Pass |
| Embodiment 52 | 7 | 3 | 1 | 100 | 1.63 | 1.8 | Pass |
| Embodiment 53 | 7 | 3 | 1 | 1500 | 10.82 | 4.1 | Pass |
| Embodiment 54 | 7 | 5 | 0.1 | 1500 | 1.51 | 1.7 | Pass |
| Embodiment 55 | 7 | 5 | 1 | 100 | 1.14 | 1.2 | Pass |
| Embodiment 56 | 7 | 5 | 1 | 1500 | 7.57 | 3.5 | Pass |
| Embodiment 57 | 7 | 7 | 0.1 | 1500 | 1.2 | 1.9 | Pass |
| Embodiment 58 | 7 | 7 | 1 | 1500 | 5.98 | 3.4 | Pass |

TABLE 6

| Division | Beam power (kW) | Joint-forming speed (m/min) | Beam radius (mm) | Frequency (Hz) | Inequality 1 (v:mm/sec) | Al segregation area fraction (%) | Tensile test results (Pass/Fail) |
| --- | --- | --- | --- | --- | --- | --- | --- |
| Comparative Example 48 | 20 | 1 | 0.1 | 100 | 0.7 | 12.2 | Fail |
| Comparative Example 49 | 20 | 1 | 0.1 | 160 | 0.98 | 10.9 | Fail |
| Comparative Example 50 | 20 | 3 | 0.1 | 100 | 0.33 | 15.2 | Fail |
| Comparative Example 51 | 20 | 3 | 0.4 | 100 | 0.86 | 14 | Fail |
| Comparative Example 52 | 20 | 5 | 0.1 | 100 | 0.23 | 15.5 | Fail |
| Comparative Example 53 | 20 | 7 | 0.1 | 100 | 0.18 | 20.9 | Fail |
| Comparative Example 54 | 20 | 7 | 1 | 100 | 0.9 | 12.2 | Fail |
| Comparative Example 55 | 20 | 8 | 0.1 | 1500 | 1.09 | 13.9 | Fail |
| Comparative Example 56 | 20 | 8 | 1 | 1500 | 5.45 | 12.7 | Fail |
| Comparative Example 57 | 20 | 10 | 1 | 1500 | 4.66 | 16.1 | Fail |
| Embodiment 59 | 20 | 1 | 0.1 | 1500 | 4.66 | 3.9 | Pass |
| Embodiment 60 | 20 | 1 | 1 | 100 | 3.51 | 4 | Pass |
| Embodiment 61 | 20 | 1 | 1 | 1500 | 23.34 | 3 | Pass |
| Embodiment 62 | 20 | 3 | 0.1 | 1500 | 2.16 | 1.9 | Pass |
| Embodiment 63 | 20 | 3 | 0.4 | 130 | 1.03 | 1.3 | Pass |
| Embodiment 64 | 20 | 3 | 0.4 | 1500 | 5.7 | 3.2 | Pass |
| Embodiment 65 | 20 | 3 | 1 | 100 | 1.63 | 0 | Pass |
| Embodiment 66 | 20 | 3 | 1 | 1500 | 10.82 | 5 | Pass |
| Embodiment 67 | 20 | 5 | 0.1 | 1500 | 1.51 | 1.2 | Pass |
| Embodiment 68 | 20 | 5 | 1 | 100 | 1.14 | 1.3 | Pass |
| Embodiment 69 | 20 | 5 | 1 | 1500 | 7.57 | 4.4 | Pass |
| Embodiment 70 | 20 | 7 | 0.1 | 1500 | 1.2 | 1.3 | Pass |
| Embodiment 71 | 20 | 7 | 1 | 1500 | 5.98 | 3 | Pass |

Referring to the results of Tables 3 to 6, in the case of Embodiments 20 to 71 of the present invention, the condition of Inequality 1 was satisfied, the aluminum segregation area fraction of the joint was 5% or less, and no fracture occurred in the joint in the tensile test results (PASS). However, in Comparative Examples 18 to 57 which deviate the conditions of the present invention, when the conditions of Inequality 1 of the present invention were not satisfied, the aluminum segregation area fraction of the joint exceeded 5%, and fracture occurred at the joint during the tensile test. In addition, even though Inequality 1 is satisfied, when the joint-forming speed exceeds 7 m/min, because the joint-forming speed is fast and the laser beam does not sufficiently stir even to the inside of the base steel, aluminum segregation occurs excessively and fracture occurred in the joint during the tensile test.

Experimental Example 4

The laser beam power, joint-forming speed, beam radius, and frequency according to the following Tables 7 and 8 were applied to join the aluminum-based plated steel plates, and an aluminum-based plating blank was manufactured in the same method as in Experimental Example 1 above, except that the laser head moves in parallel to the same direction as the direction in which the joint is formed and the laser beam was irradiated at a pattern angle of the conditions in the following Tables 7 and 8 with respect to the direction in which the joint is formed. In this case, the pattern angle means an angle formed by the direction in which the joint is formed and the movement path of the laser beam on the surface of the plated steel plate while the joint is formed.

After manufacturing three blank specimens of embodiments 72 to 101 and Comparative Examples 58 to 77, respectively, each specimen was heated to austenite single-phase temperature or higher (Ac3 or higher) and cooled to 300° C. or less at a cooling speed of 10-500° C./s. Next, the aluminum segregation area fraction of the joint of each specimen, whether aluminum segregation occurred at the interface of the joint, and the tensile test results are shown in Tables 7 and 8 below. Specifically, the measurement of the area fraction of aluminum (Al) segregation in the joint was expressed as an average value of the area fraction of Al segregation in three specimens. The results of the tensile test indicate that after tensile force is applied to the specimen, the case in which fracture does not occur at the joint in all three specimens is determined as X, and the case in which fracture occurs at least once in the joint is determined as O.

TABLE 7

| Division | Beam power (kW) | Joint-forming speed (m/min) | Beam radius (mm) | Frequency (Hz) | The pattern angle (degree) | Al segregation area fraction (%) | the joint The boundary surface The Al segregation | The joint Whether fracture occurs |
|---|---|---|---|---|---|---|---|---|
| Comparative Example 58 | 3 | 1 | 0.1 | 1500 | 20 | 4.8 | Exist | O |
| Comparative Example 59 | | | | | 40 | 4.1 | Exist | O |
| Embodiment 72 | | | | | 45 | 4.9 | None | X |
| Embodiment 73 | | | | | 60 | 4.1 | None | X |
| Embodiment 74 | | | | | 85 | 3.2 | None | X |
| Comparative Example 60 | 3 | 1 | 1 | 100 | 20 | 4.8 | Exist | O |
| Comparative Example 61 | | | | | 40 | 4.2 | Exist | O |
| Embodiment 75 | | | | | 45 | 0 | None | X |
| Embodiment 76 | | | | | 60 | 4.1 | None | X |
| Embodiment 77 | | | | | 85 | 3.4 | None | X |
| Comparative Example 62 | 3 | 1 | 1 | 1500 | 20 | 4.8 | Exist | O |
| Comparative Example 63 | | | | | 40 | 4.3 | Exist | O |
| Embodiment 78 | | | | | 45 | 0 | None | X |
| Embodiment 79 | | | | | 60 | 4.5 | None | X |
| Embodiment 80 | | | | | 85 | 3.1 | None | X |
| Comparative Example 64 | 3 | 7 | 0.1 | 1500 | 20 | 3.2 | Exist | O |
| Comparative Example 65 | | | | | 40 | 2.2 | Exist | O |
| Embodiment 81 | | | | | 45 | 1.2 | None | X |
| Embodiment 82 | | | | | 60 | 1.8 | None | X |
| Embodiment 83 | | | | | 85 | 0.5 | None | X |
| Comparative Example 66 | 3 | 7 | 1 | 1500 | 20 | 4.7 | Exist | O |
| Comparative Example 67 | | | | | 40 | 4.2 | Exist | O |
| Embodiment 84 | | | | | 45 | 3.9 | None | X |
| Embodiment 85 | | | | | 60 | 1.5 | None | X |
| Embodiment 86 | | | | | 85 | 0 | None | X |

TABLE 8

| Division | Beam power (kW) | Joint-forming speed (m/min) | Beam radius (mm) | Frequency (Hz) | The pattern angle (degree) | Al segregation area fraction (%) | The joint The boundary surface The Al segregation | The joint Whether fracture occurs |
|---|---|---|---|---|---|---|---|---|
| Comparative Example 68 | 7 | 1 | 0.1 | 1500 | 20 | 4.6 | Exist | O |
| Comparative Example 69 | | | | | 40 | 4.1 | Exist | O |
| Embodiment 87 | | | | | 45 | 5 | None | X |
| Embodiment 88 | | | | | 60 | 4.1 | None | X |
| Embodiment 89 | | | | | 85 | 3.9 | None | X |
| Comparative Example 70 | 7 | 1 | 1 | 100 | 20 | 4.7 | Exist | O |
| Comparative Example 71 | | | | | 40 | 3.9 | Exist | O |
| Embodiment 90 | | | | | 45 | 3.5 | None | X |
| Embodiment 91 | | | | | 60 | 3.5 | None | X |
| Embodiment 92 | | | | | 85 | 3.5 | None | X |
| Comparative Example 72 | 7 | 1 | 1 | 1500 | 20 | 4.7 | Exist | O |
| Comparative Example 73 | | | | | 40 | 4.5 | Exist | O |
| Embodiment 93 | | | | | 45 | 4.9 | None | X |
| Embodiment 94 | | | | | 60 | 4.1 | None | X |
| Embodiment 95 | | | | | 85 | 2.8 | None | X |
| Comparative Example 74 | 7 | 7 | 0.1 | 1500 | 20 | 4.9 | Exist | O |

TABLE 8-continued

| Division | Beam power (kW) | Joint-forming speed (m/min) | Beam radius (mm) | Frequency (Hz) | The pattern angle (degree) | Al segregation area fraction (%) | The joint The boundary surface The Al segregation | The joint Whether fracture occurs |
|---|---|---|---|---|---|---|---|---|
| Comparative Example 75 | | | | | 40 | 3.5 | Exist | O |
| Embodiment 96 | | | | | 45 | 1.9 | None | X |
| Embodiment 97 | | | | | 60 | 1.8 | None | X |
| Embodiment 98 | | | | | 85 | 1.1 | None | X |
| Comparative Example 76 | 7 | 7 | 1 | 1500 | 20 | 4.8 | Exist | O |
| Comparative Example 77 | | | | | 40 | 3.8 | Exist | O |
| Embodiment 99 | | | | | 45 | 3.4 | None | X |
| Embodiment 100 | | | | | 60 | 2.8 | None | X |
| Embodiment 101 | | | | | 85 | 1.9 | None | X |

Meanwhile, even though the area fraction of aluminum segregation of the joint satisfies 5% or less, when aluminum (Al) segregation occurs at the interface between the joint and the base steel, there is a high possibility that fracture occurs in the joint, specifically, at the interface of the joint and the steel plate. Referring to the results of Tables 7 and 8, in the case of an exemplary embodiment in which the pattern angle of 45° or greater and less than 90° is applied, it was found that aluminum segregation of the joint is formed with an area fraction of 5% or less, and the occurrence of aluminum (Al) segregation at the interface between the joint and the base steel may be prevented and fracture in the joint is prevented during the tensile test. On the other hand, in Comparative Examples 58 to 77 to which a pattern angle of less than 45° was applied, it was found that aluminum segregation occurred at the interface of the joint, and fracture in the joint occurred.

Figure 5A:
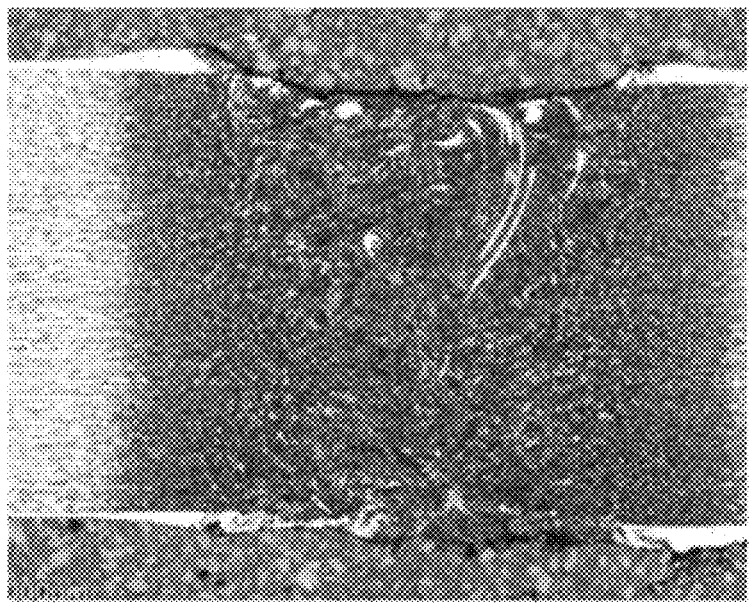
FIGS. 5A and 5B are cross-sectional views schematically showing a cross-section of an aluminum-based plated blank according to an exemplary embodiment, respectively.
Figure 5B:
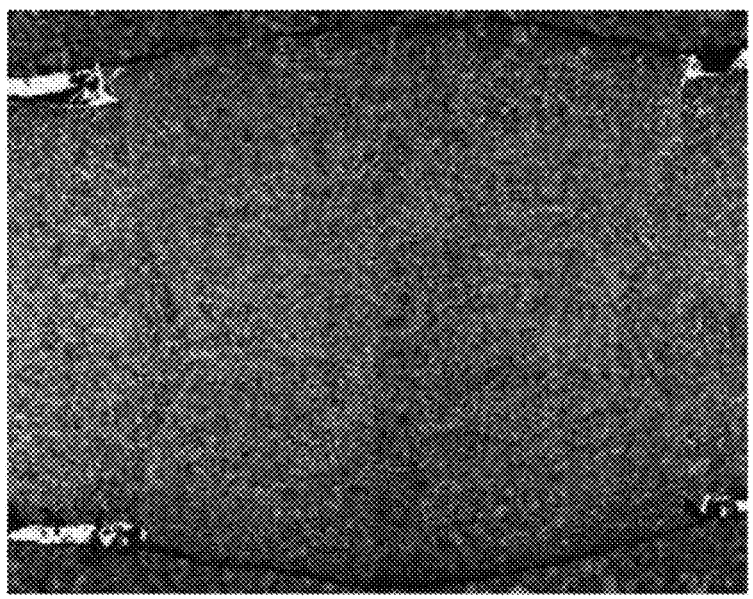

FIG. 5A shows a cross section of an aluminum-based plated blank manufactured by a conventional method of joining with a laser beam, but does not apply a preset pattern angle to the laser beam, and FIG. 5B is a photo by an optical microscope, showing an aluminum-based blank of Embodiment 1. Referring to FIGS. 5A and 5B, when applying the conventional method that does not apply a predetermined pattern angle to the laser beam, because the ingredient of the plated layer was not sufficiently diluted with the ingredient of the base steel, area fraction of the aluminum segregation increased. On the other hand, in the case of Embodiment 1, it was found that the ingredients of the plated layer were sufficiently diluted with the ingredients of the base steel, so that the occurrence of aluminum segregation at the joints could be minimized.

Figure 6A:
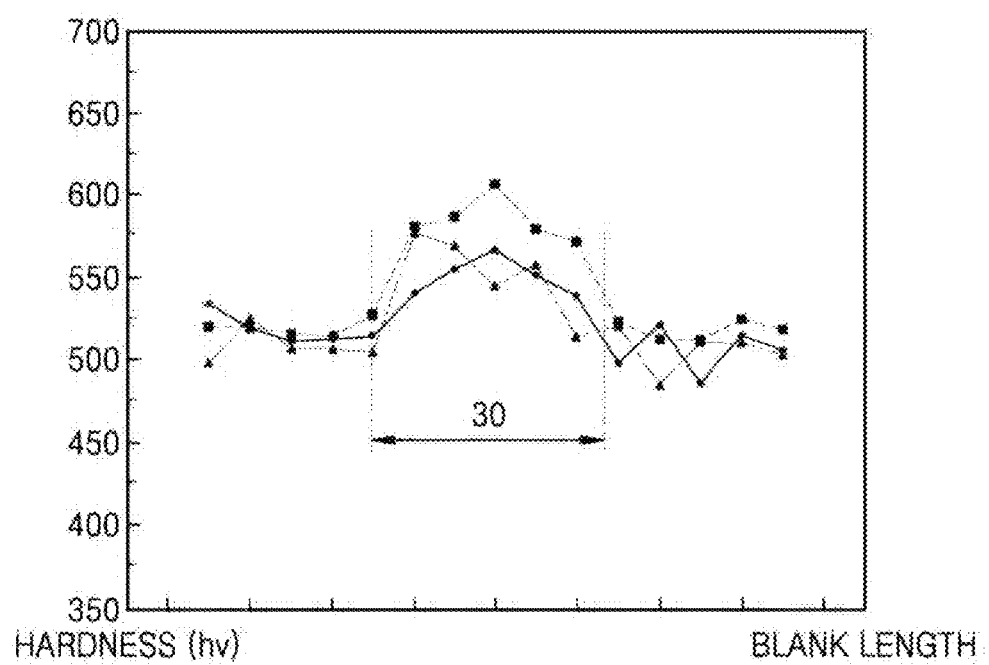
FIGS. 6A and 6B are graphs showing changes in hardness for each portion after hot stamping molding of an aluminum-based plated blank, respectively.
Figure 6B:
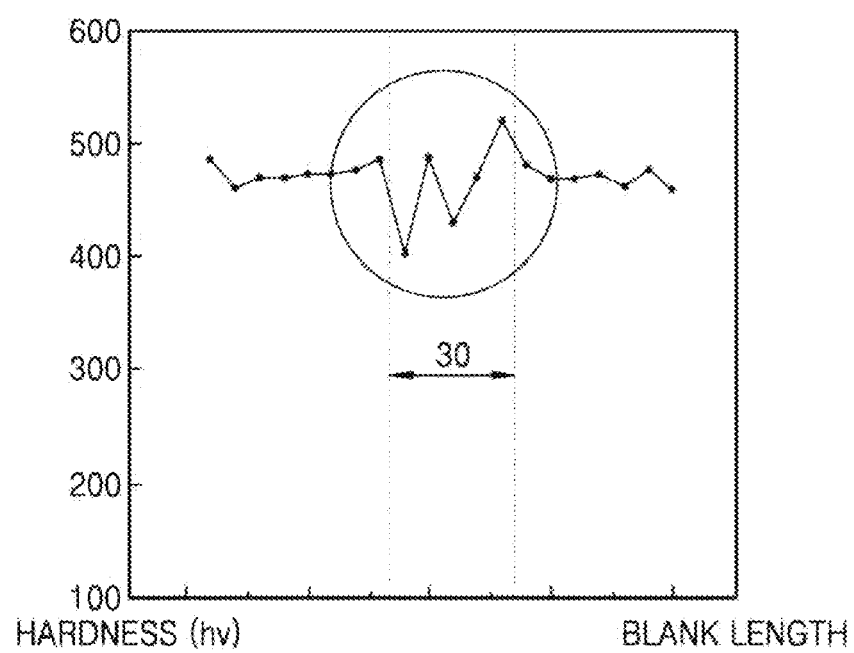

FIG. 6A is a graph showing the change in hardness for each portion after hot stamping molding of the aluminum-based blank of Embodiment 10, and FIG. 6B is a graph showing the change in hardness for each portion of the aluminum-based blank of Comparative Example 10. Referring to FIGS. 6A and 6B, in Embodiment 10, the minimum hardness of the joint 30 after hot stamping was greater than or equal to the minimum hardness of the plated steel plate (or base steel), but in Comparative Example 10 which deviates from the condition of the present invention, it was found that the minimum hardness of the joint 30 after hot stamping was less than or equal to the minimum hardness of the plated steel plate (or base steel).

Figure 7A:
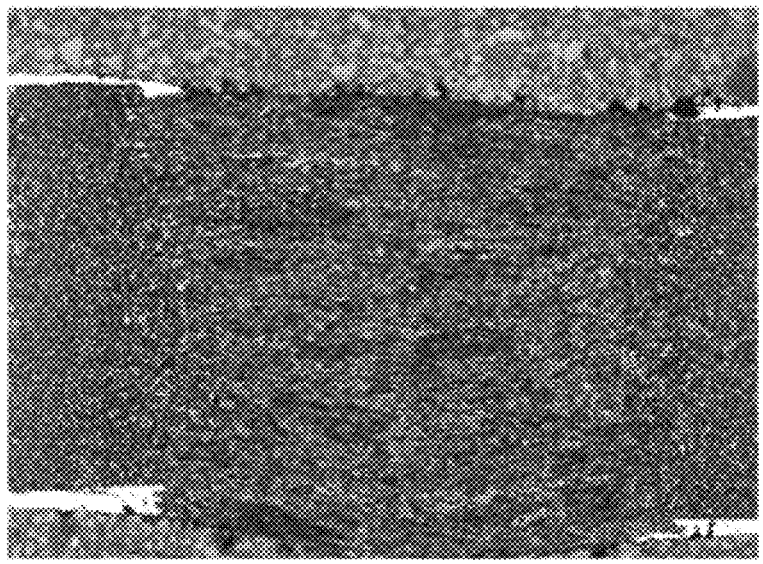
FIGS. 7A and 7B are cross-sectional views schematically showing a cross-section of an aluminum-based plated blank according to an exemplary embodiment, respectively.
Figure 7B:
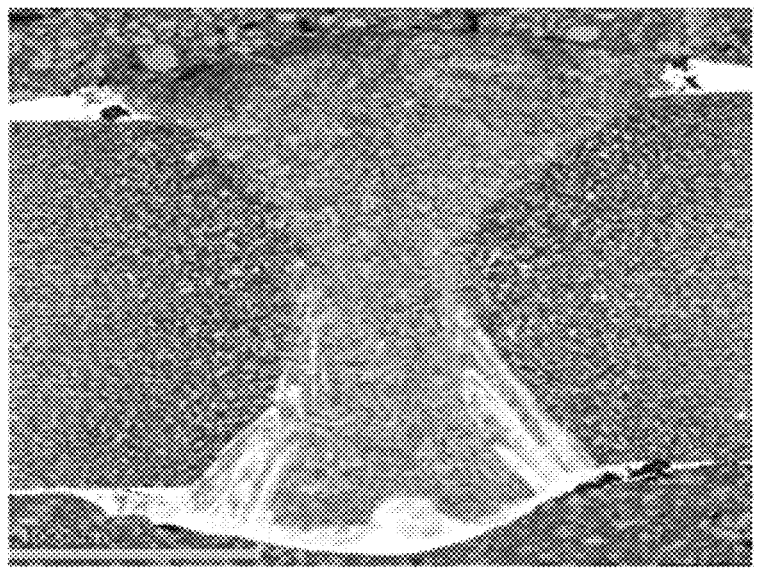

FIG. 7A is a cross-section of the aluminum-based blank of Embodiment 37, and FIG. 7B is a photo by an optical microscope, showing a cross-section of the aluminum-based blank of Comparative Example 33.

Referring to FIGS. 7A and 7B, in the aluminum-based blank of Embodiment 37, the aluminum segregation of the joint was minimized, but in Comparative Example 33 which deviates from the conditions of Inequality 1 of the present invention, it was found that the occurrence of aluminum segregation in the joint increased compared to Embodiment 37.

While the present invention has been described with reference to an embodiment shown in the drawings, it will be understood by those of ordinary knowledge in the art that these are more examples and various changes in form and details may be made therein. Accordingly, the true technical scope of the present invention should be defined by the spirit of the appended claims.

The invention claimed is:

1. An aluminum-based plated blank comprising:
    a first plated steel plate;
    a second plated steel plate connected to the first plated steel plate; and
    a joint connecting the first plated steel plate and the second plated steel plate at a boundary between the first plated steel plate and the second plated steel plate,
    wherein each of the first plated steel plate and the second plated steel plate comprises a base steel and a plated layer formed with an adhesion amount of 20 to 100 g/m$^2$ on at least one surface of the base steel and comprising aluminum (Al),
    wherein the joint comprises aluminum (Al), and an average content of aluminum (Al) in the joint is 0.5 wt % or greater and 1.5 wt % or less,
    wherein the joint comprises a first lateral portion, a central portion, and a second lateral portion, each of which comprises three portions sequentially arranged in a direction crossing a width direction of the joint, totaling nine portions, and
    wherein a standard deviation of an aluminum (Al) content of the joint, when determined from the nine points, is 0 wt % or greater and 0.25 wt % or less.

2. The aluminum-based plated blank of claim 1, wherein the plated layer includes:
    a surface layer formed on the base steel and comprising aluminum (Al) in an amount of 80 wt % or greater; and
    a diffusion layer formed between the surface layer and the base steel, wherein the diffusion layer includes aluminum-iron (Al—Fe) and aluminum-iron-silicon (Al—Fe—Si) compounds.

3. The aluminum-based plated blank of claim 2, wherein the base steel comprises carbon (C) in an amount of 0.01 wt % or greater and 0.5 wt % or less, silicon (Si) in an amount of 0.01 wt % or greater to 1.0 wt % or less, manganese (Mn) in an amount of 0.3 wt % or greater to 2.0 wt % or less, phosphorus (P) in an amount greater than 0 and 0.1 wt % or less, sulfur(S) in an amount greater than 0 and 0.1 wt % or less, the balance of iron (Fe), and other unavoidable impurities.

4. The aluminum-based plated blank of claim 1, wherein the joint comprises carbon (C) in an amount of 0.05 wt % or greater and less than 3.0 wt %, silicon (Si) in an amount of 0.05 wt % or greater and less than 1.0 wt %, manganese (Mn) in an amount of 1.0 wt % or greater and less than 3.0 wt %, phosphorus (P) of greater than 0 and less than 0.2 wt %, sulfur(S) in an amount of greater than 0 and less than 0.2 wt %, titanium (Ti) in an amount of 0.01 wt % or greater and less than 0.5 wt %, or boron (B) in an amount of 0.0005 wt % or greater and less than 0.01 wt %.

5. The aluminum-based plated blank of claim 1, wherein a standard deviation of an aluminum (Al) content of the first lateral portion, when determined from the three points of the first lateral portion, is 0 wt % or greater and 0.20 wt % or less.

6. The aluminum-based plated blank of claim 1, wherein a standard deviation of an aluminum (Al) content of the second lateral portion, when determined from the three points of the second lateral portion, is 0 wt % or greater and 0.20 wt % or less.

* * * * *